(12) United States Patent
Goto

(10) Patent No.: US 12,475,712 B2
(45) Date of Patent: Nov. 18, 2025

(54) DRIVER ASSISTANCE APPARATUS AND VEHICLE, AND RECORDING MEDIUM CONTAINING COMPUTER PROGRAM

(71) Applicant: SUBARU CORPORATION, Tokyo (JP)

(72) Inventor: Ikuo Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/926,034

(22) PCT Filed: Sep. 30, 2021

(86) PCT No.: PCT/JP2021/036166
§ 371 (c)(1),
(2) Date: Nov. 17, 2022

(87) PCT Pub. No.: WO2023/053355
PCT Pub. Date: Apr. 6, 2023

(65) Prior Publication Data
US 2024/0233392 A1    Jul. 11, 2024

(51) Int. Cl.
*G06V 20/58* (2022.01)
*G06T 7/70* (2017.01)
*G06V 10/60* (2022.01)

(52) U.S. Cl.
CPC .......... *G06V 20/58* (2022.01); *G06T 7/70* (2017.01); *G06V 10/60* (2022.01); *G06T 2207/30261* (2013.01)

(58) Field of Classification Search
CPC .......... G06V 20/58; G06V 10/60; G06T 7/70; G06T 2207/30261; G08G 1/16
See application file for complete search history.

(56) References Cited

U.S. PATENT DOCUMENTS 10,553,116 B2 * 2/2020 Yi .......................... G06V 20/58
2011/0279256 A1 * 11/2011 Higgins-Luthman .... H04N 7/18
348/148

(Continued)

FOREIGN PATENT DOCUMENTS

JP     2002-074595 A    3/2002
JP     2009-244985 A    10/2009

(Continued)

OTHER PUBLICATIONS

International Search Report in the corresponding International Application No. PCT/JP2021/036166 dated Dec. 14, 2021, with English Translation (4 pages).

(Continued)

*Primary Examiner* — Amandeep Saini
*Assistant Examiner* — Emma Rose Goebel
(74) *Attorney, Agent, or Firm* — Rimon P.C.

(57) ABSTRACT

A driver assistance apparatus configured to assist in driving to avoid collision with an object is configured to: detect a shadow of an object present in a blind spot region as viewed from a vehicle, on the basis of image data that captures a surrounding view around the vehicle; estimate a position of a light source that causes the shadow; and calculate a position, a direction of movement, and a speed of movement of the object on the basis of the position of the light source and a time change in the shadow, and determines possibility of collision between the vehicle and the object.

17 Claims, 13 Drawing Sheets

(56) References Cited

U.S. PATENT DOCUMENTS

| | | | |
|---|---|---|---|
| 2012/0327188 A1* | 12/2012 | Takemura | G08G 1/167 |
| | | | 348/148 |
| 2013/0338914 A1* | 12/2013 | Weiss | G08G 1/0129 |
| | | | 340/905 |
| 2016/0097644 A1* | 4/2016 | Strassenburg-Kleciak | ............... |
| | | | G01C 21/30 |
| | | | 701/461 |
| 2019/0012537 A1* | 1/2019 | Heimberger | G06T 7/60 |
| 2019/0339706 A1* | 11/2019 | Batur | G05D 1/0223 |
| 2020/0290606 A1 | 9/2020 | Watanabe et al. | |
| 2022/0017081 A1 | 1/2022 | Yokoyama et al. | |

FOREIGN PATENT DOCUMENTS

| | | |
|---|---|---|
| JP | 2016-122308 A | 7/2016 |
| JP | 2019-109591 A | 7/2019 |
| JP | 2020-154502 A | 9/2020 |

OTHER PUBLICATIONS

Office Action received in corresponding Japanese Patent Application No. 2023-550921, dated Aug. 6, 2024, w/ English Translation.

* cited by examiner

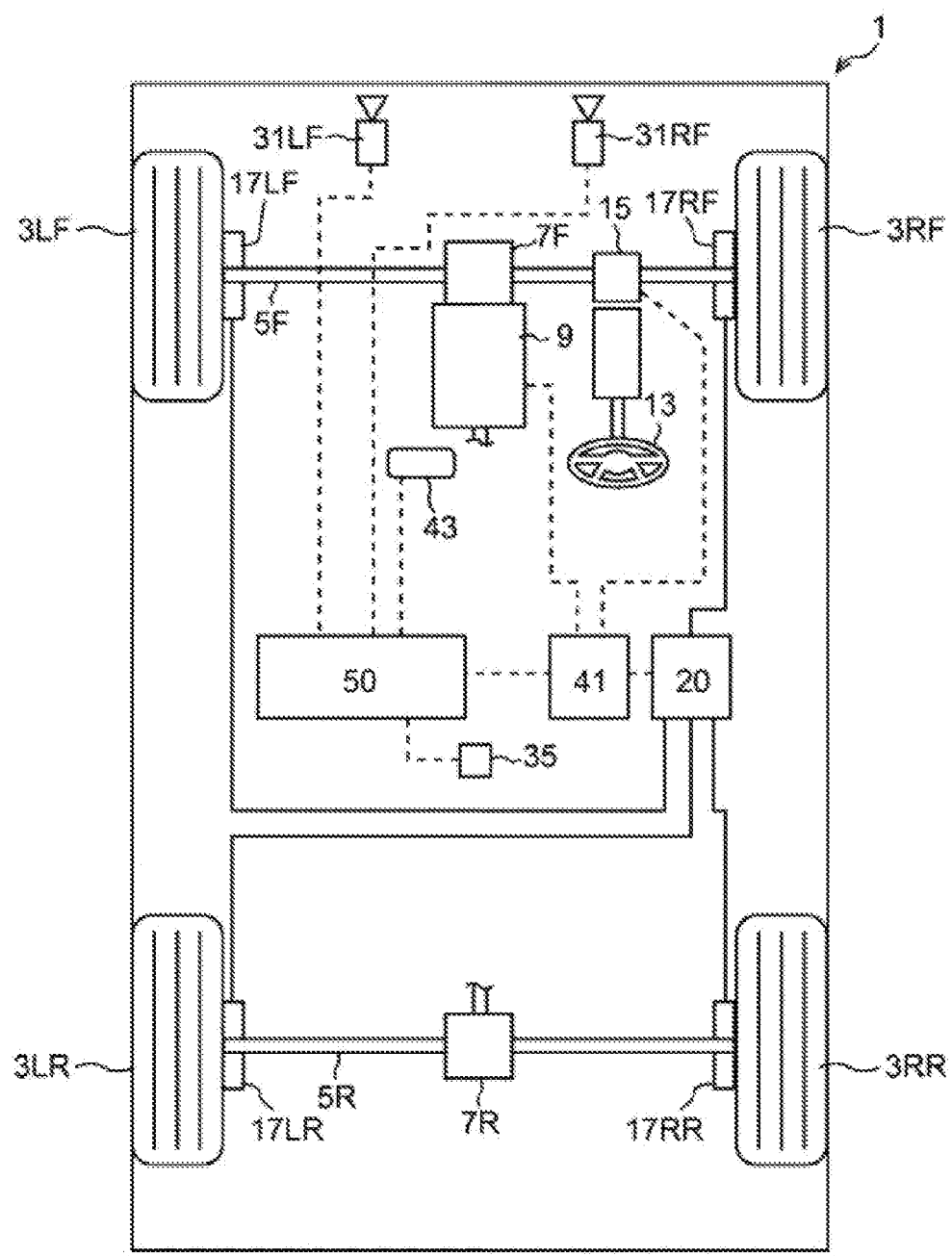
[ FIG. 1 ]

[FIG. 2]
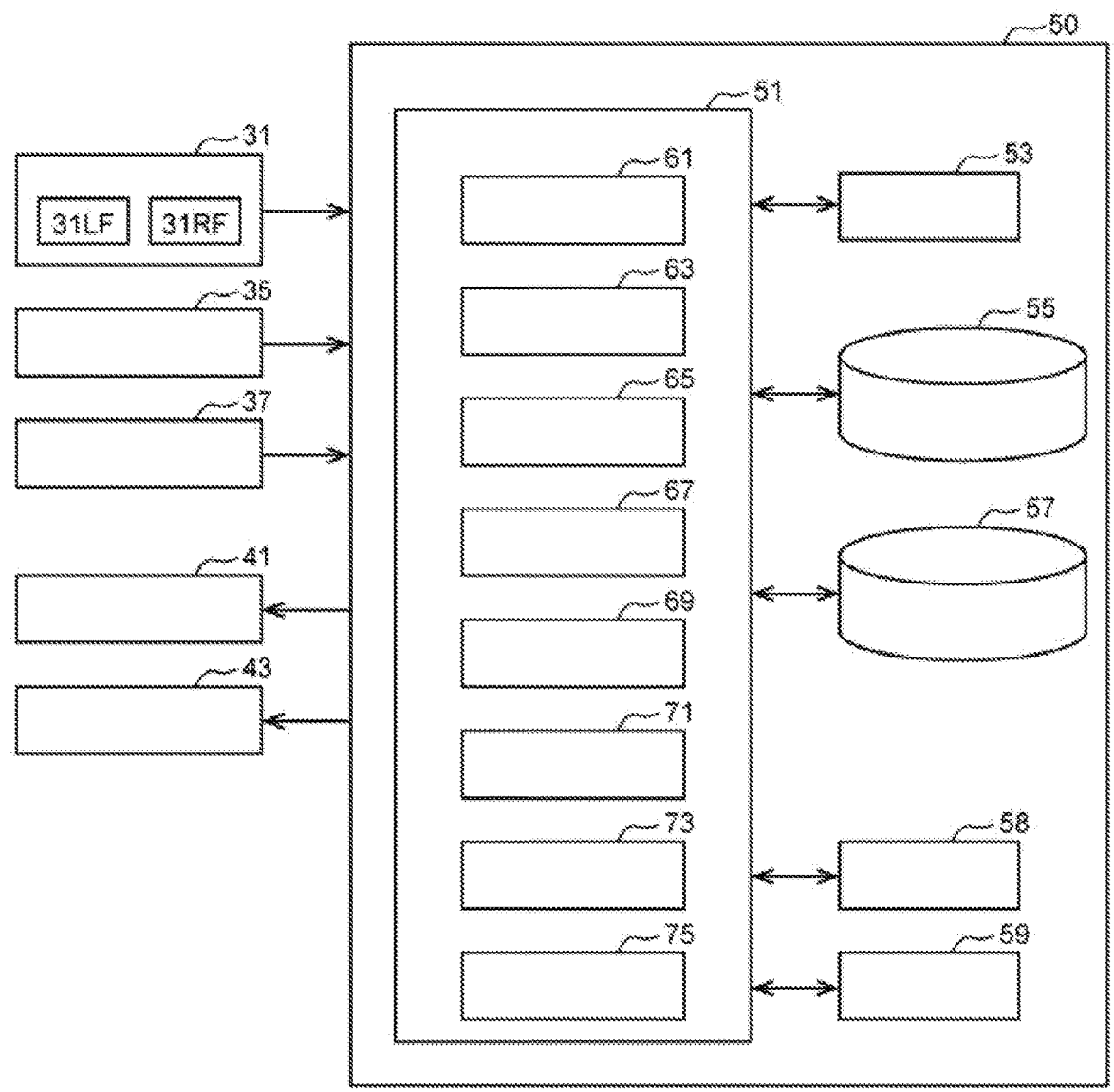

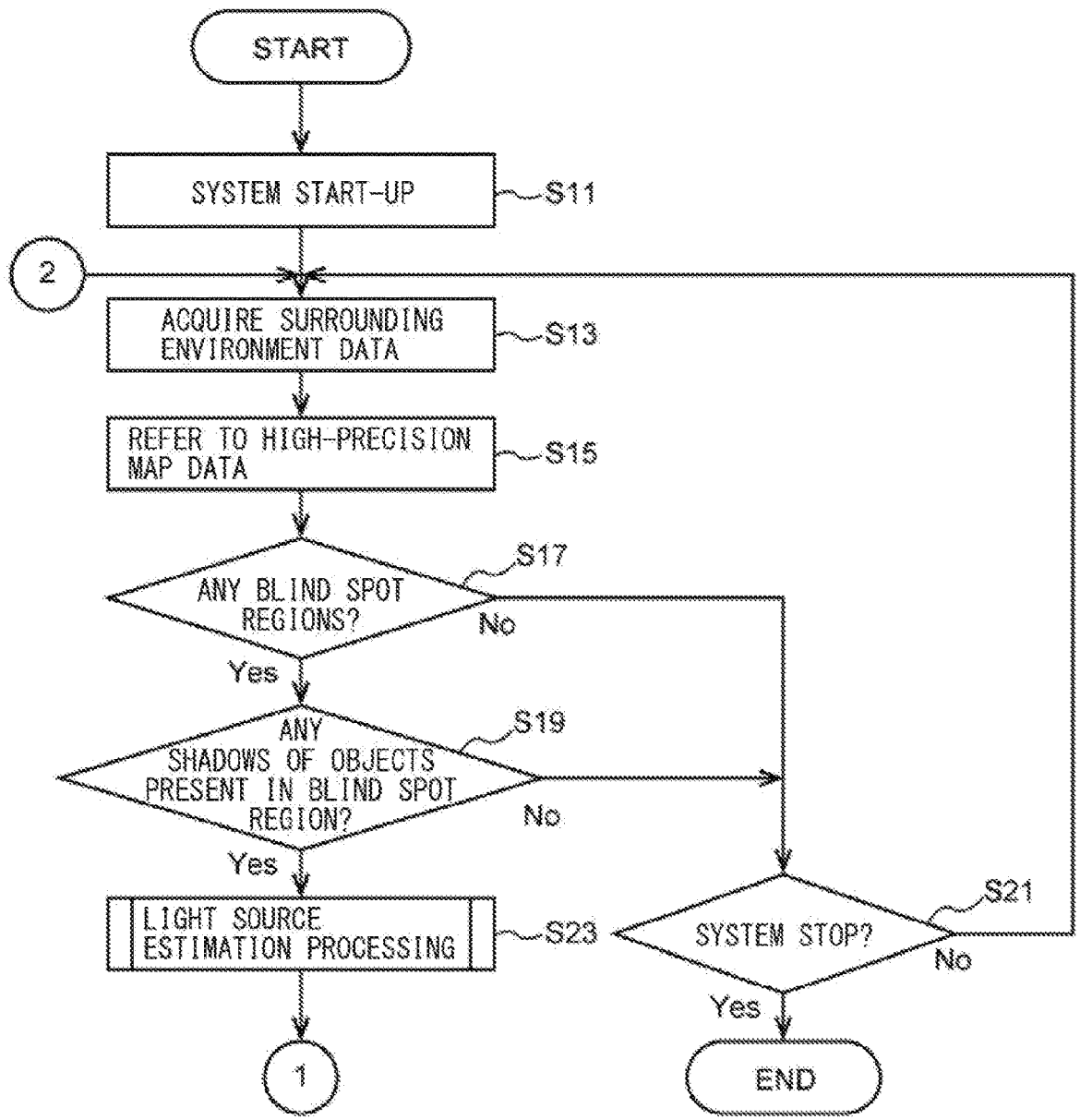
[FIG. 3]

[ FIG. 4 ]
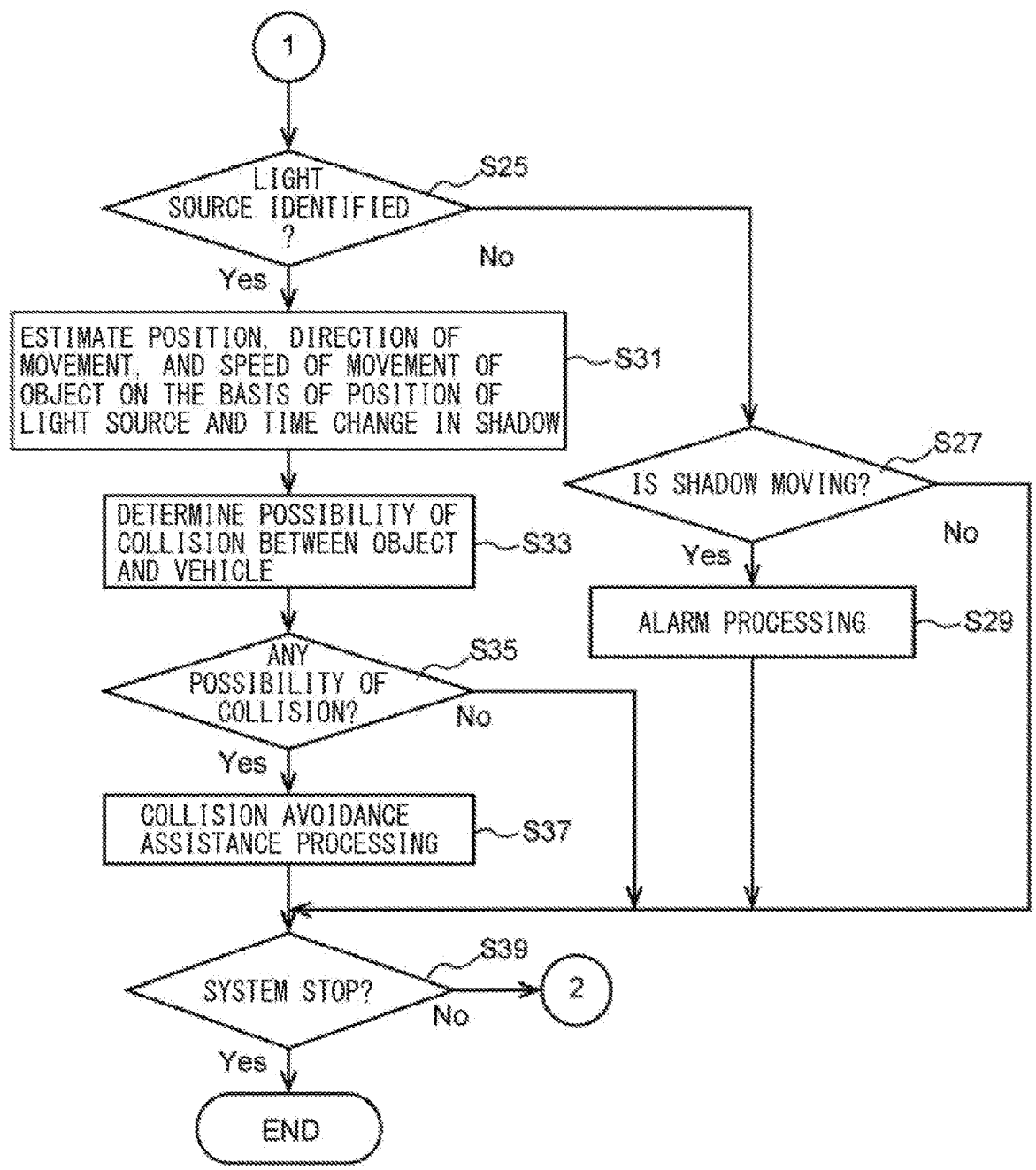

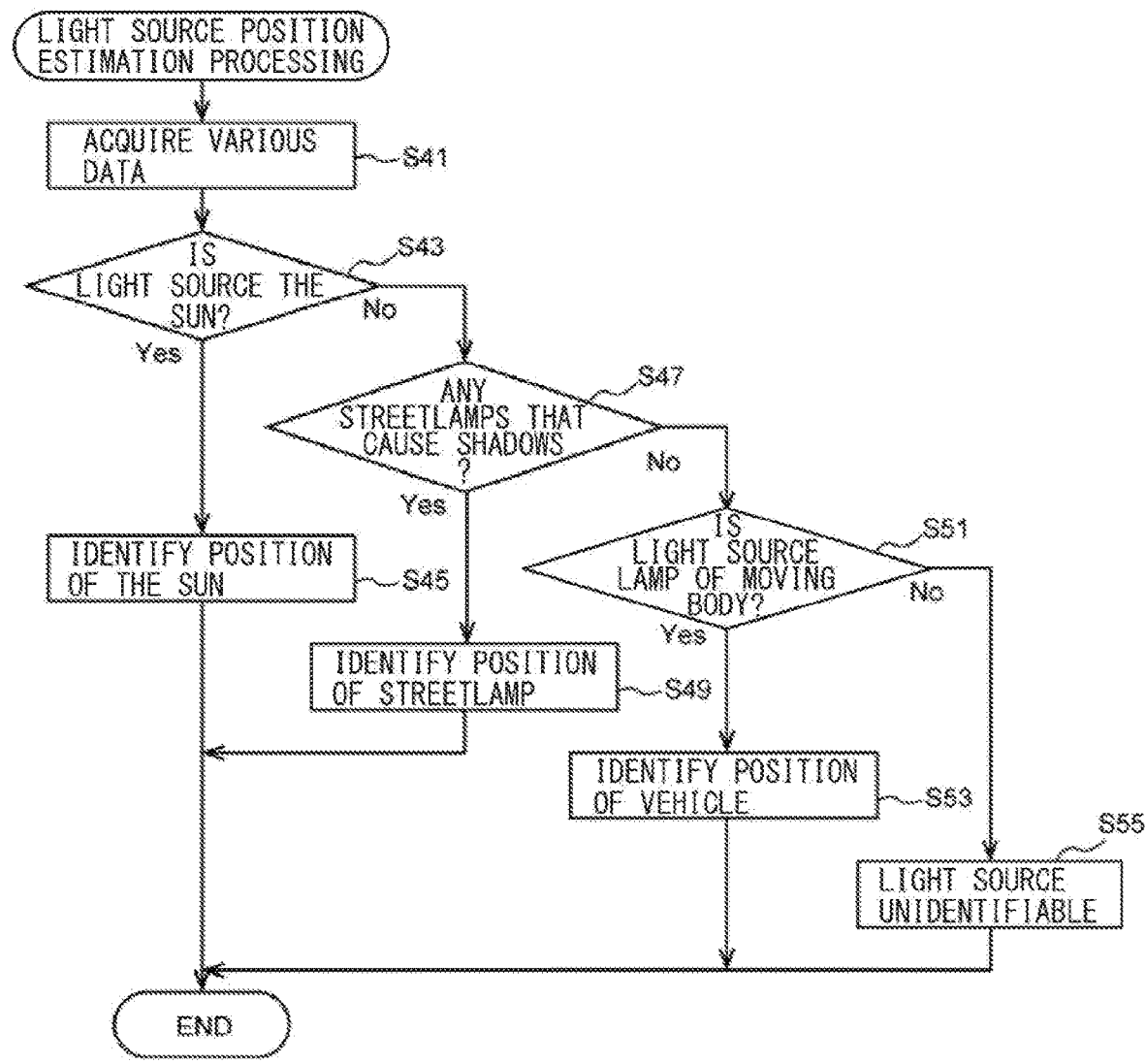

[ FIG. 6 ]
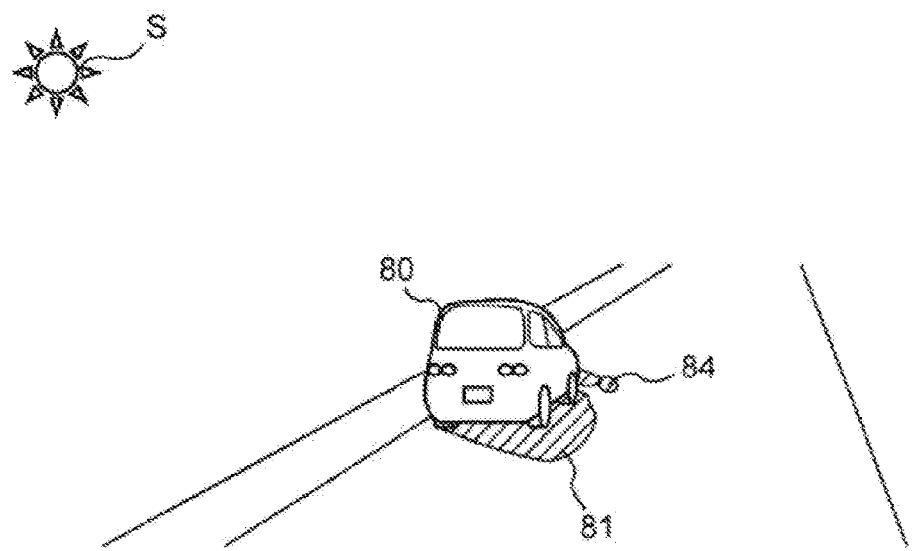
[ FIG. 7 ]
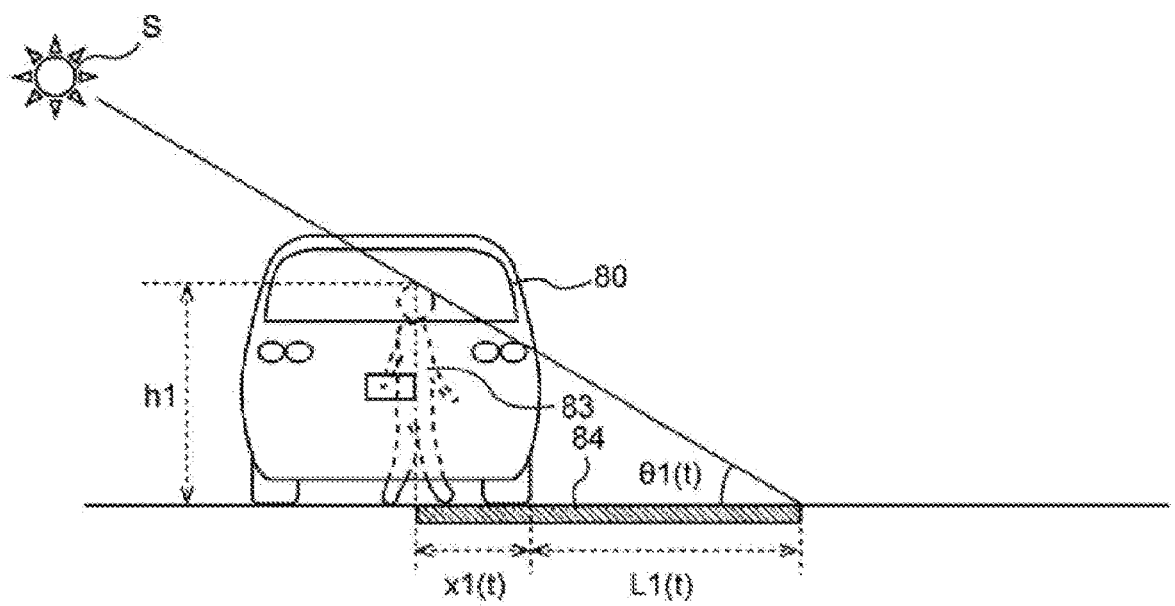

[ FIG. 8 ]
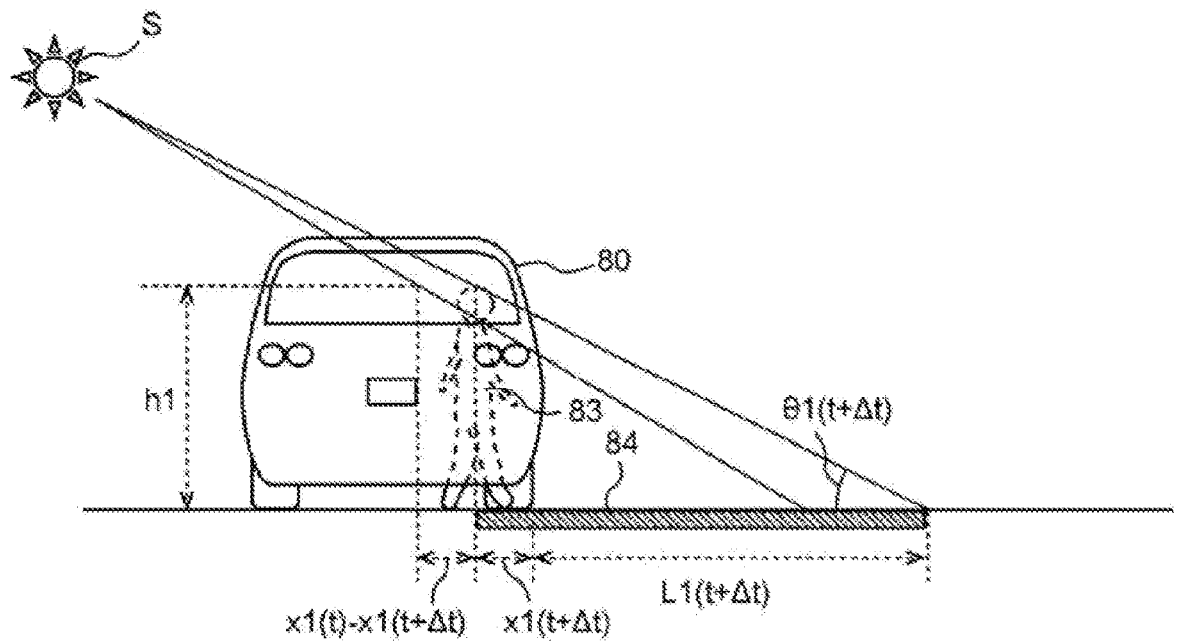
[ FIG. 9 ]
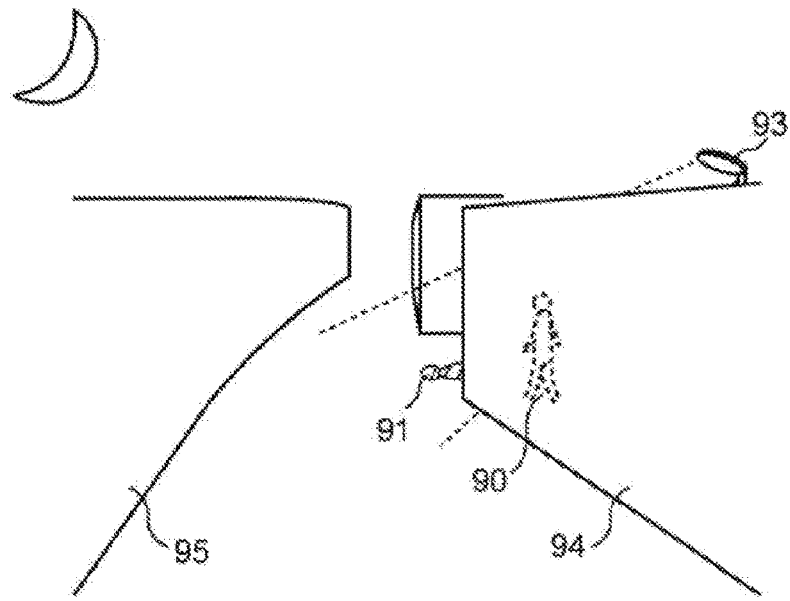

[ FIG. 10 ]
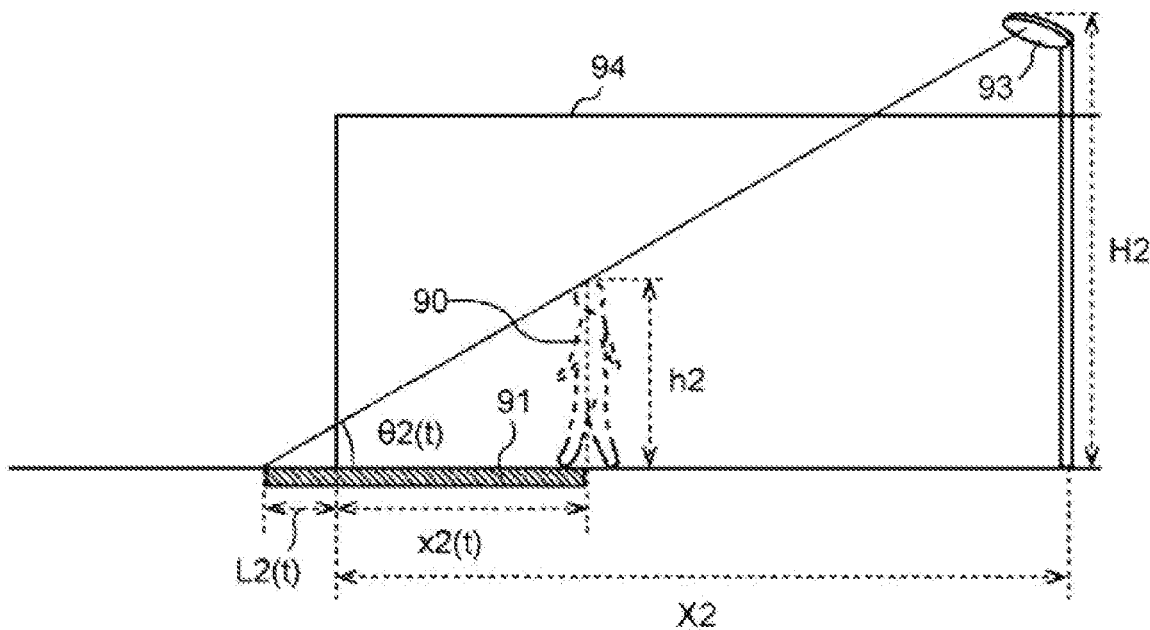
[ FIG. 11 ]
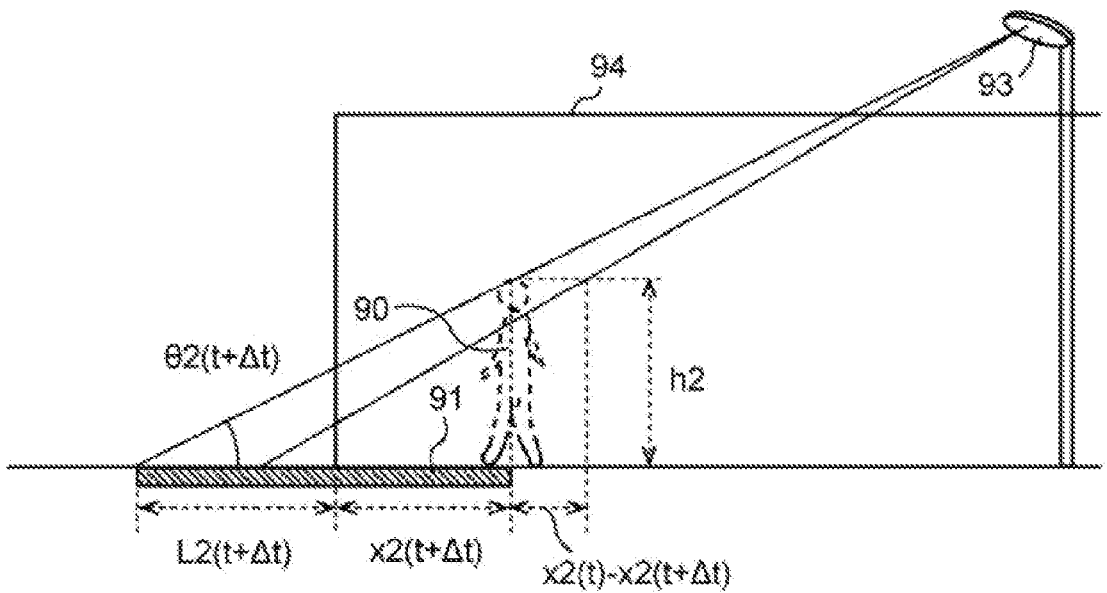

[FIG. 12]
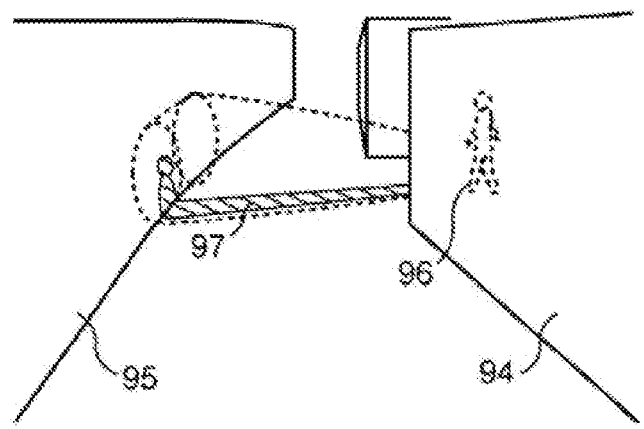
[FIG. 13]
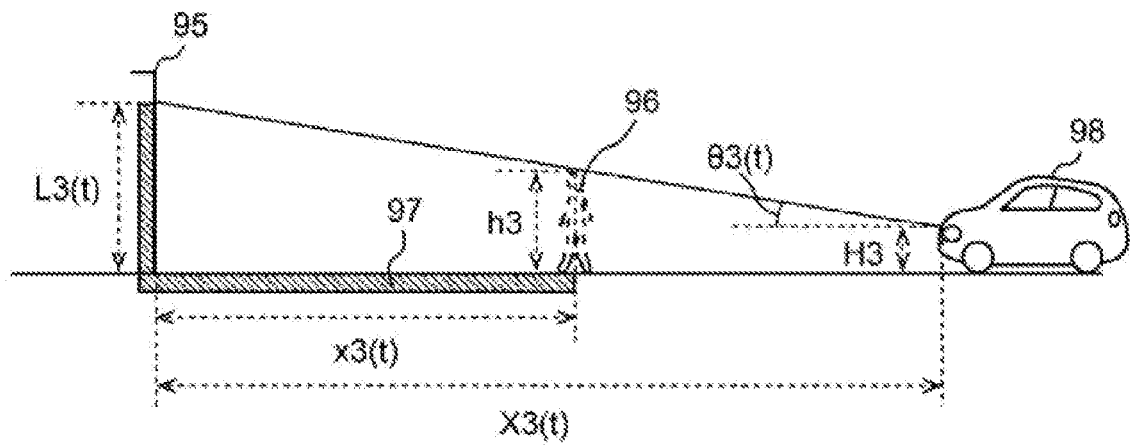
[FIG. 14]
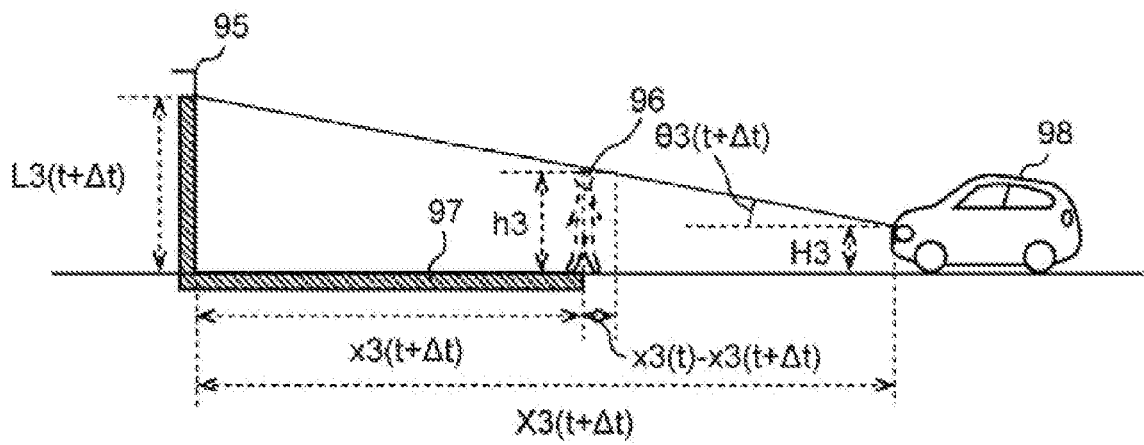

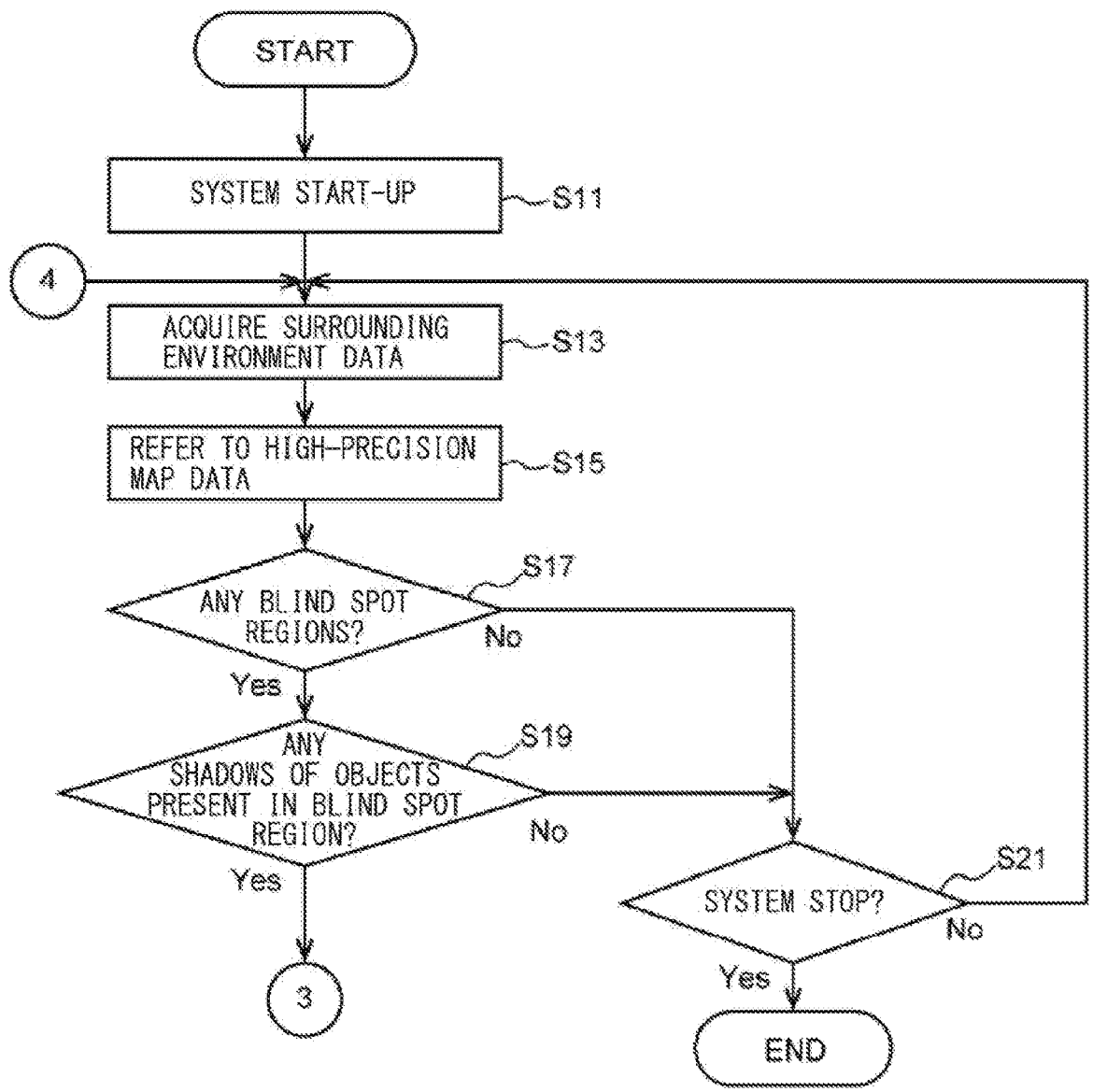

[FIG. 16]
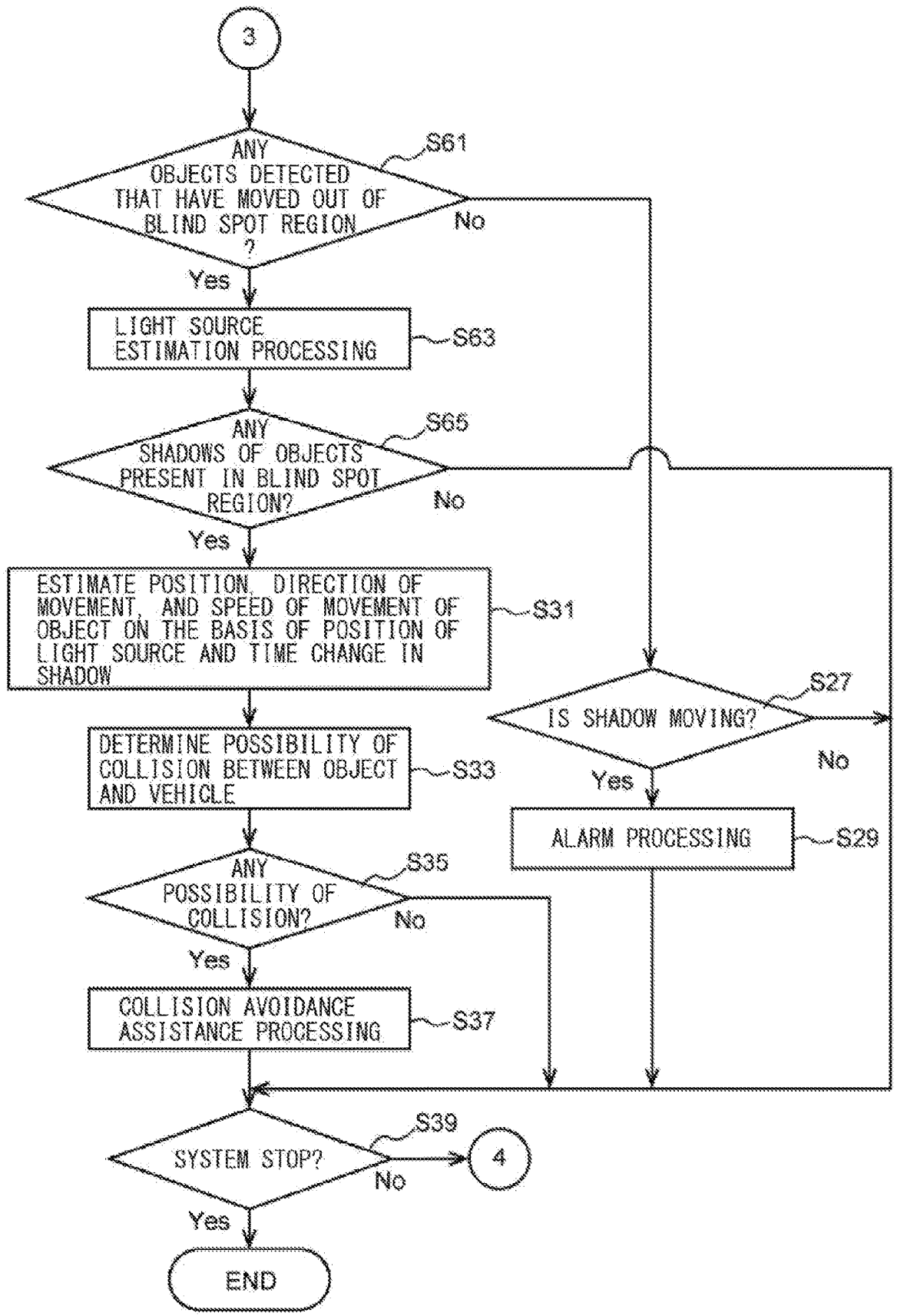

[ FIG. 17 ]
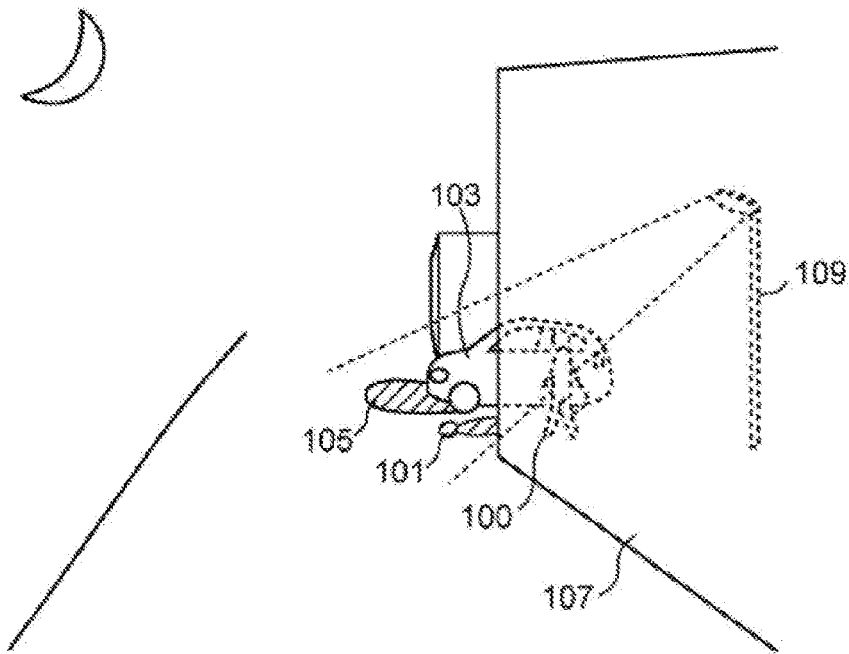
[ FIG. 18 ]
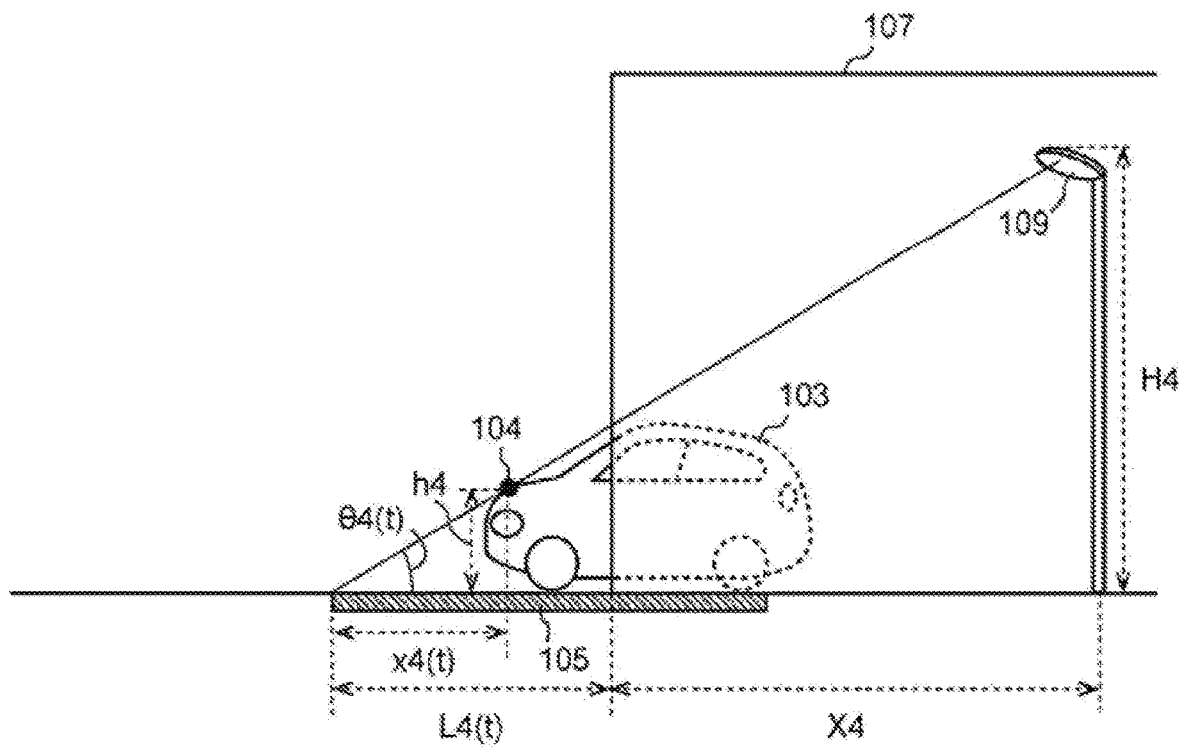

[ FIG. 19 ]
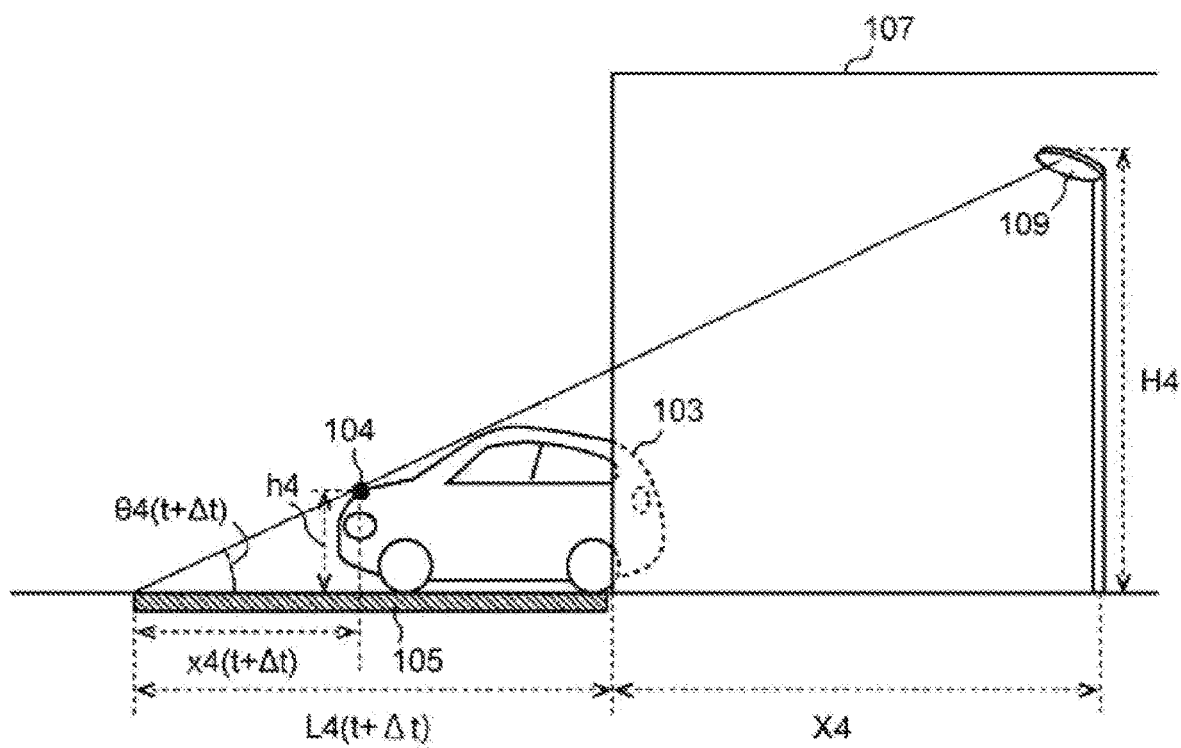

DRIVER ASSISTANCE APPARATUS AND VEHICLE, AND RECORDING MEDIUM CONTAINING COMPUTER PROGRAM

CROSS REFERENCE TO RELATED APPLICATIONS

This application is the U.S. National Phase under 35 US.C. § 371 of International Application No. PCT/JP2021/036166, filed on Sep. 30, 2021, the entire contents of each are hereby incorporated by reference.

TECHNICAL FIELD

The disclosure relates to a driver assistance apparatus and a vehicle, and a recording medium containing a computer program that assist in driving a vehicle to avoid collision with an object that rushes out of a blind spot region.

BACKGROUND ART

Recently, the practical application of vehicles equipped with a driver assistance function and an automated driving function has been promoted mainly for the purpose of reduction in traffic accidents and reduction in a burden of driving. For example, apparatuses have been known that detect an object present around the vehicle on the basis of data detected by various sensors and assist in driving the vehicle, to avoid collision between the vehicle and the object. The various sensors are, for example, a vehicle outside capturing camera and LiDAR (Light Detection and Ranging) provided in the vehicle. However, in some traffic accidents, there are phenomena that are difficult to avoid unless a preparatory action such as deceleration is taken assuming an accident in advance, e.g., a sudden rush out of a blind spot region.

Whereas, for example, Patent Literature 1 offers a proposal for a vehicle control apparatus that is able to control a vehicle appropriately in accordance with situations in a case where the vehicle travels in a situation with blind spots. Specifically, Patent Literature 1 discloses a vehicle control apparatus that: detects a blind spot region that makes a blind spot for the vehicle; determines relative priority between a route of a moving object that possibly appears from the blind spot region and a route of the vehicle; and outputs a control signal for the vehicle on the basis of the priority determined.

CITATION LIST

Patent Literature

Patent Literature 1: Japanese Unexamined Patent Application Publication No. 2016-122308

SUMMARY OF INVENTION

Problem to be Solved by the Invention

However, the vehicle control apparatus disclosed in Patent Literature 1 does not actually detect an object that rushes out of the blind spot region, and therefore, carries out a control such as deceleration even if nothing actually rushes out when the vehicle travels through the blind spot region. Repeating, for example, deceleration in spite of no rushes lowers reliability or acceptability of the driver assistance apparatus. Depending on cases, this results in possibility that a driver assistance function is no longer used.

The disclosure is made in view of such a problem, and it is an object of the disclosure to provide a driver assistance apparatus and a vehicle, and a recording medium containing a computer program that make it possible to detect an object present in a blind spot region and determine collision between the object and the vehicle.

Means for Solving the Problem

To solve the above-described problem, according to an aspect of the disclosure, a driver assistance apparatus is provided that is configured to assist in driving to avoid collision with an object. The driver assistance apparatus includes: one or more processors; and one or more memories communicably coupled to the one or more processors. The one or more processors are configured to: detect a shadow of an object present in a blind spot region as viewed from a vehicle, on the basis of image data that captures a surrounding view around the vehicle; estimate a position of a light source that causes the shadow; and calculate a position, a direction of movement, and a speed of movement of the object on the basis of the position of the light source and a time change in the shadow, and determine possibility of collision between the vehicle and the object.

Moreover, to solve the above-described problem, according to another aspect of the disclosure, a driver assistance apparatus is provided that is configured to assist in driving to avoid collision with an object. The driver assistance apparatus includes: a shadow region detection unit configured to detect a shadow of an object present in a blind spot region as viewed from a vehicle, on the basis of image data that captures a surrounding view around the vehicle; a light source position estimation unit configured to estimate a position of a light source that causes the shadow; and a collision determination unit configured to calculate a position, a direction of movement, and a speed of movement of the object on the basis of the position of the light source and a time change in the shadow, and determine possibility of collision between the vehicle and the object.

Moreover, to solve the above-described problem, according to another aspect of the disclosure, a vehicle is provided. The vehicle is provided with a driver assistance apparatus configured to assist in driving to avoid collision with an object. The driver assistance apparatus includes: one or more processors; and one or more memories communicably coupled to the one or more processors. The one or more processors are configured to: detect a shadow of an object present in a blind spot region as viewed from a vehicle, on the basis of image data that captures a surrounding view around the vehicle; estimate a position of a light source that causes the shadow; and calculate a position, a direction of movement, and a speed of movement of the object on the basis of the position of the light source and a time change in the shadow, and determine possibility of collision between the vehicle and the object.

Moreover, to solve the above-described problem, according to another aspect of the disclosure, a recording medium containing a computer program applicable to a driver assistance apparatus configured to assist in driving to avoid collision with an object is provided. The computer program causes one or more processors to execute processing including: detecting a shadow of an object present in a blind spot region as viewed from a vehicle, on the basis of image data that captures a surrounding view around the vehicle; estimating a position of a light source that causes the shadow; and calculating a position, a direction of movement, and a speed of movement of the object on the basis of the position of the light source and a time change in the shadow, and determining possibility of collision between the vehicle and the object.

Effects of the Invention

As described above, according to the disclosure, it is possible to detect an object present in a blind spot region and determine collision between the relevant object and the vehicle.

BRIEF DESCRIPTION OF DRAWINGS

FIG. 1 is a schematic diagram that illustrates a configuration example of a vehicle including a driver assistance apparatus according to an embodiment of the disclosure.

FIG. 2 is a block diagram that illustrates a configuration example of the driver assistance apparatus according to a first embodiment.

FIG. 3 is a flowchart of processing operation of the driver assistance apparatus according to the embodiment.

FIG. 4 is a flowchart of the processing operation of the driver assistance apparatus according to the embodiment.

FIG. 5 is a flowchart of light source position estimation processing by the driver assistance apparatus according to the embodiment.

FIG. 6 is a diagram that illustrates a travel scene provided for description of an example where a light source is the sun.

FIG. 7 is a diagram that illustrates a state of the travel scene in FIG. 6, as viewed from a direction of travel of the vehicle.

FIG. 8 is a diagram that illustrates the state of the travel scene in FIG. 6, as viewed from the direction of travel of the vehicle.

FIG. 9 is a diagram that illustrates a travel scene provided for description of an example where the light source is a streetlamp.

FIG. 10 is a diagram that illustrates a state of the travel scene in FIG. 9, as viewed from the direction of travel of the vehicle.

FIG. 11 is a diagram that illustrates the state of the travel scene in FIG. 9, as viewed from the direction of travel of the vehicle.

FIG. 12 is a diagram that illustrates a travel scene provided for description of an example where the light source is a lamp of a moving body.

FIG. 13 is a diagram that illustrates a state of the travel scene in FIG. 12, as viewed from the direction of travel of the vehicle.

FIG. 14 is a diagram that illustrates the state of the travel scene in FIG. 12, as viewed from the direction of travel of the vehicle.

FIG. 15 is a flowchart of processing operation of a driver assistance apparatus according to a second embodiment.

FIG. 16 is a flowchart of the processing operation of the driver assistance apparatus according to the embodiment.

FIG. 17 is a diagram that illustrates a travel scene provided for description of a method of estimating a position of a light source according to the embodiment.

FIG. 18 is a diagram that illustrates a state of the travel scene in FIG. 17, as viewed from a direction of travel of the vehicle.

FIG. 19 is a diagram that illustrates the state of the travel scene in FIG. 17, as viewed from the direction of travel of the vehicle.

MODES FOR CARRYING OUT THE INVENTION

In the following, some preferred embodiments of the disclosure are described in detail with reference to the accompanying drawings. Note that throughout the present description and the drawings, constituent elements having substantially the same function and configuration are denoted with the same reference numerals to avoid any redundant description.

1. First Embodiment

<1-1. Overall Configuration of Vehicle>

First, description is given of an example of an overall configuration of a vehicle including a driver assistance apparatus according to an embodiment of the disclosure.

FIG. 1 is a schematic diagram that illustrates a configuration example of a vehicle 1 including a driver assistance apparatus 50 according to the present embodiment. The vehicle 1 illustrated in FIG. 1 is constituted as a four-wheel drive vehicle that transmits driving torque to a left front wheel 3LF, a right front wheel 3RF, a left rear wheel 3LR, and a right rear wheel 3RR (in the following, collectively referred to as "wheels 3" unless distinction is particularly necessary). The driving torque is outputted from a driving force source 9 that generates the driving torque for the vehicle 1. The driving force source 9 may be an internal combustion engine such as a gasoline engine or a diesel engine, or may be a driving motor. The driving force source 9 may include an internal combustion engine and a driving motor together.

It is to be noted that the vehicle 1 may be an electric vehicle including two driving motors, e.g., a front wheel driving motor and a rear wheel driving motor, or may be an electric vehicle including driving motors that correspond to the respective wheels 3. Moreover, in a case where the vehicle 1 is an electric vehicle or a hybrid electric vehicle, a secondary battery, and a generator such as a motor and a fuel cell are mounted on the vehicle 1. The secondary battery accumulates electric power to be supplied to the driving motor. The generator generates electric power to be charged in the battery. Furthermore, the vehicle 1 may be a two-wheel-driven four-wheeled vehicle, or may be other kinds of vehicles such as a two-wheeled vehicle.

The vehicle 1 includes the driving force source 9, an electric steering device 15, and a brake hydraulic control unit 20, as devices to be used in a driving control of the vehicle 1. The driving force source 9 outputs the driving torque to be transmitted to a front wheel driving shaft 5F and a rear wheel driving shaft 5R through an unillustrated transmission, a front wheel differential mechanism 7F, and a rear wheel differential mechanism 7R. Driving of the driving force source 9 and the transmission is controlled by a vehicle control device 41 including one or more electronic control units (ECU: Electronic Control Unit).

The electric steering device 15 is provided on the front wheel driving shaft 5F. The electric steering device 15 includes an unillustrated electric motor and an unillustrated gear mechanism. The electric steering device 15 is controlled by the vehicle control device 41 to adjust steering angles of the left front wheel 3LF and the right front wheel 3RF. In manual driving, the vehicle control device 41 controls the electric steering device 15 on the basis of a steering angle of a steering wheel 13 by a driver. Moreover, in automated driving, the vehicle control device 41 controls the electric steering device 15 on the basis of a target steering angle to be set by the driver assistance apparatus 50 or an unillustrated automated driving control device.

A brake system of the vehicle 1 is constituted as a hydraulic brake system. The brake hydraulic control unit 20 adjusts hydraulic pressure to be supplied to each of brake calipers 17LF, 17RF, 17LR, and 17RR (hereinafter, collectively referred to as "brake calipers 17" unless distinction is particularly necessary) provided respectively on the front, rear, left, and right drive wheels 3LF, 3RF, 3LR, and 3RR, to generate a braking force. Driving of the brake hydraulic control unit 20 is controlled by the vehicle control device 41. In the case where the vehicle 1 is an electric vehicle or a hybrid electric vehicle, the brake hydraulic control unit 20 is used in conjunction with a regenerative brake by the driving motor.

The vehicle control device 41 includes one or more electronic control devices that control driving of the driving force source 9, the electric steering device 15, and the brake hydraulic control unit 20. The driving force source 9 outputs the driving torque for the vehicle 1. The electric steering device 15 controls the steering angle of the steering wheel 13 or a steering wheel. The brake hydraulic control unit 20 controls the braking force of the vehicle 1. The vehicle control device 41 may have a function of controlling the driving of the transmission that performs shifting of an output outputted from the driving force source 9 and transmits the resultant output to the wheels 3. The vehicle control device 41 is configured to acquire data transmitted from the driver assistance apparatus 50 or the unillustrated automated driving control device, and is configured to execute an automated driving control of the vehicle 1. Moreover, in the manual driving of the vehicle 1, the vehicle control device 41 acquires data regarding an amount of an operation by the driving by the driver, and controls the driving of the driving force source 9, the electric steering device 15, and the brake hydraulic control unit 20. The driving force source 9 outputs the driving torque for the vehicle 1. The electric steering device 15 controls the steering angle of the steering wheel 13 or the steering wheel. The brake hydraulic control unit 20 controls the braking force of the vehicle 1.

Moreover, the vehicle 1 includes forward view capturing cameras 31LF and 31RF, a vehicle state sensor 35, and a GNSS (Global Navigation Satellite System) sensor 37. The forward view capturing cameras 31LF and 31RF constitute a surrounding environment sensor 31 to acquire data regarding surrounding environment around the vehicle 1. The forward view capturing cameras 31LF and 31RF capture a forward view of the vehicle 1 and generate image data. The forward view capturing cameras 31LF and 31RF include imaging elements such as CCD (Charged-Coupled Devices) or CMOS (Complementary Metal-Oxide-Semiconductor), and transmit the generated image data to the driver assistance apparatus 50.

In the vehicle 1 illustrated in FIG. 1, the forward view capturing cameras 31LF and 31RF constitute a stereo camera including a pair of left and right cameras. However, the forward view capturing cameras 31LF and 31RF may each be a monocular camera. In addition to the forward view capturing cameras 31LF and 31RF, the vehicle 1 may include, for example, a rearward view capturing camera, or a left or right rearward view capturing camera. The rearward view capturing camera is provided in a rear part of the vehicle 1 and captures a rearward view. The left or right rearward view capturing camera is provided on a side mirror 11L or 11R.

The vehicle 1 may include one or more sensors out of LiDAR, a radar sensor such as millimeter wave radar, and an ultrasonic sensor, together with the forward view capturing cameras 31LF and 31RF, as the surrounding environment sensor to acquire the data regarding the surrounding environment.

The vehicle state sensor 35 includes one or more sensors that detect an operation state and behavior of the vehicle 1. The vehicle state sensor 35 includes, for example, at least one of a steering angle sensor, an accelerator position sensor, a brake stroke sensor, a brake pressure sensor, or an engine speed sensor. These sensors each detect the operation state of the vehicle 1 such as the steering angle of the steering wheel 13 or the steering wheel, an accelerator position, an amount of a brake operation, or an engine speed. Moreover, the vehicle state sensor 35 includes, for example, at least one of a vehicle speed sensor, an acceleration rate sensor, or an angular speed sensor. These sensors each detect the behavior of the vehicle such as a vehicle speed, a longitudinal acceleration rate, a lateral acceleration rate, and a yaw rate. The vehicle state sensor 35 transmits a sensor signal including the detected data, to the driver assistance apparatus 50.

The GNSS sensor 37 receives satellite signals transmitted from satellites typified by GPS (Global Positioning System) satellites. The GNSS sensor 37 transmits, to the driver assistance apparatus 50, positional data regarding the vehicle 1 on a world coordinate system included in the satellite signals received. It is to be noted that the GNSS sensor 37 may include an antenna that receives satellite signals from other satellite systems that identifies the position of the vehicle 1 than the GPS satellites.

A notification device 43 provides the driver with various kinds of information by means such as image display or sound output, on the basis of the data transmitted from the driver assistance apparatus 50. The notification device 43 includes, for example, a display unit and a speaker. The display unit is provided in an instrument panel. The speaker is provided in the vehicle. The display unit may be a display unit of a navigation system. Moreover, the notification device 43 may include an HUD (Head Up Display) that provides display on a windshield in superimposition over scenes around the vehicle 1.

<1-2. Driver Assistance Apparatus>

Next, the driver assistance apparatus 50 according to the present embodiment is described in detail. It is to be noted that, in the following, the vehicle 1 on which the driver assistance apparatus 50 is mounted is referred to as the vehicle.

(1-2-1. Overall Configuration)

FIG. 2 is a block diagram illustrating a configuration example of the driver assistance apparatus 50 according to the present embodiment.

To the driver assistance apparatus 50, the surrounding environment sensor 31, the vehicle state sensor 35, and the GNSS sensor 37 are coupled through a dedicated line, or communication means such as CAN (Controller Area Network) or LIN (Local Inter Net). Moreover, to the driver assistance apparatus 50, the vehicle control device 41 and the notification device 43 are coupled through a dedicated line, or the communication means such as CAN or LIN. It is to be noted that the driver assistance apparatus 50 is not limited to an electronic control device mounted on the vehicle 1, but may be a terminal device such as a smartphone or a wearable device.

The driver assistance apparatus 50 functions as an apparatus that assists in driving the vehicle 1 by allowing the one or more processors such as a CPU (Central Processing Unit) to execute a computer program. The computer program is a computer program that causes the processors to perform operation described later to be performed by the driver assistance apparatus 50. The computer program to be executed by the processors may be contained in a recording medium functioning as a storage 53 (memory) provided in the driver assistance apparatus 50. Alternatively, the computer program to be executed by the processors may be contained in a recording medium built in the driver assistance apparatus 50, or any recording medium externally attachable to the driver assistance apparatus 50.

The recording medium containing the computer program may be: a magnetic medium such as a hard disk, a floppy disk, and a magnetic tape; an optical recording medium such as a CD-ROM (Compact Disk Read Only Memory), a DVD (Digital Versatile Disk), and a Blu-ray (registered trademark); a magnetic-optical medium such as a floptical disk; a storage element such as a RAM (Random Access Memory) and a ROM (Read Only Memory); a flash memory such as a USB (Universal Serial Bus) memory and an SSD (Solid State Drive); or any other medium that is able to hold programs.

The driver assistance apparatus 50 includes a processor 51 and the storage 53. The processor 51 includes one or more processors. A portion or all of the processor 51 may include an updatable one such as firmware, or may be, for example, a program module to be executed in accordance with a command from, for example, a CPU. The storage 53 includes a memory such as a RAM or a ROM. The storage 53 is communicably coupled to the processor 51. However, there is no particular limitation on the number of the storages 53 and the kind of the storage 53. The storage 53 holds a computer program to be executed by the processor 51, and data to be used in calculation processing, e.g., various parameters, detection data, and calculation results.

Moreover, the driver assistance apparatus 50 includes a high-precision map data storage 55 and a solar position data storage 57. The high-precision map data storage 55 and the solar position data storage 57 each include a recording medium communicably coupled to the processor 51. The high-precision map data storage 55 holds map data including positional data and three-dimensional geometry data regarding roads and structures outside roads. The high-precision map data includes, for example, positional data and three-dimensional geometry data regarding structures such as buildings, sidewalls, hedges, and bridges, and installed objects such as traffic lights and streetlamps. In particular, the high-precision map data includes data regarding heights of light sources of the streetlamps. Moreover, the solar position data storage 57 holds solar altitude and a direction of the sun. The solar position data includes data regarding the solar altitude and the direction of the sun in accordance with the time, the season, and regions.

The recording medium constituting the high-precision map data storage 55 and the solar position data storage 57 may be any recording medium. Moreover, the high-precision map data storage 55 and the solar position data storage 57 may be provided in, for example, a server outside the vehicle coupled through wireless communication means such as mobile communication.

Moreover, the driver assistance apparatus 50 includes a first communication unit 58 and a second communication unit 59. The first communication unit 58 and the second communication unit 59 are each an interface for external communication that is communicably coupled to the processor 51. The first communication unit 58 is, for example, an interface for wireless communication such as mobile communication, and is used for transmission and reception with telematics services. The second communication unit 59 is an interface for vehicle-to-vehicle communication, and is used for communication with random vehicles around the vehicle 1.

(1-2-2. Functional Configuration)

The processor 51 of the driver assistance apparatus 50 includes a traveling state detection unit 61, a surrounding environment detection unit 63, a blind spot region detection unit 65, a shadow region detection unit 67, a light source position estimation unit 69, a collision determination unit 71, a driving condition setting unit 73, and a notification unit 75. These units are each a function to be realized by execution of a computer program by a processor. However, a portion of each unit may include an analog circuit. In the following, after brief description of the function of each unit, processing operation of the driver assistance apparatus 50 is described in detail.

(Traveling State Detection Unit)

The traveling state detection unit 61 acquires data regarding the operation state and the behavior of the vehicle 1 on the basis of the detection data transmitted from the vehicle state sensor 35. The traveling state detection unit 61 acquires the data regarding the operation state of the vehicle 1 such as the steering angle of the steering wheel or the steering wheel, the accelerator position, the amount of the brake operation, or the engine speed, and the data regarding the behavior of the vehicle 1 such as the vehicle speed, the longitudinal acceleration rate, the lateral acceleration rate, and the yaw rate, on predetermined calculation cycles. The traveling state detection unit 61 records these pieces of the data in the storage 53.

(Surrounding Environment Detection Unit)

The surrounding environment detection unit 63 detects the surrounding environment around the vehicle 1 on the basis of the image data transmitted from the surrounding environment sensor 31. Specifically, the surrounding environment detection unit 63 calculates a kind, a size (width, height, and depth), and a position of an object present ahead of the vehicle 1, a distance from the vehicle 1 to the object, and a relative speed between the vehicle 1 and the object. The object to be detected includes a random vehicle traveling, a parked vehicle, pedestrians, bicycles, sidewalks, curb stones, buildings, utility poles, traffic signs, traffic lights, natural objects, and any other moving bodies and stationary objects present around the vehicle 1.

(Blind Spot Region Detection Unit)

The blind spot region detection unit 65 detects a blind spot region as viewed from the vehicle 1 on the basis of the data regarding the surrounding environment detected by the surrounding environment detection unit 63 and the high-precision map data storage 55. For example, the blind spot region detection unit 65 detects a region beyond a corner ahead of the vehicle 1, as the blind spot region, on the basis of the high-precision map data storage 55. The region beyond the corner ahead of the vehicle 1 is undetectable by the surrounding environment sensor 31 because of a building such as a sidewall in front of the corner ahead of the vehicle 1. Moreover, the blind spot region detection unit 65 detects a region behind a parked vehicle, as the blind spot region, on the basis of the data regarding the surrounding environment detected by the surrounding environment detection unit 63. The region behind the parked vehicle is undetectable by the surrounding environment sensor 31 because of the parked vehicle ahead of the vehicle 1. It is to be noted that the blind spot region detection unit 65 may detect the blind spot region as viewed from the vehicle 1 on the basis of either the data regarding the surrounding environment detected by the surrounding environment detection unit 63 or the high-precision map data storage 55. However, there is no particular limitation on the method of detecting the blind spot region.

(Shadow Region Detection Unit)

The shadow region detection unit 67 detects a shadow present in the image data on the basis of the image data transmitted from the surrounding environment sensor 31. In the present embodiment, a "shadow" refers to a patch of shade on, for example, a wall or the ground caused by an object such as a moving body or a stationary object blocking the travel of the light. For example, it is possible for the shadow region detection unit 67 to identify the shadow by obtaining an outline along which brightness or hue greatly changes within a predetermined distance, on the basis of brightness data and hue data regarding each pixel in the image data. However, there is no particular limitation on the method of detecting the shadow, but any known shadow detection techniques may be utilized. The shadow to be detected by the shadow region detection unit 67 includes not only a shadow of the object detected by the surrounding environment detection unit 63, but also a shadow of an object that is present in the blind spot region as viewed from the vehicle 1 but is not directly detected by the surrounding environment detection unit 63 (hereinafter, also referred to as a "latent object").

(Light Source Position Estimation Unit)

The light source position estimation unit 69 estimates a position of a light source emitting light that causes the shadow detected by the shadow region detection unit 67. In the present embodiment, the light source position estimation unit 69 estimates the light source and the position of the light source with the use of the image data transmitted from the surrounding environment sensor 31, the time data, the high-precision map data, the solar position data, and the data acquired from the telematics services as well as data acquired from random vehicles through the vehicle-to-vehicle communication. Specifically, the light source position estimation unit 69 distinguishes: a case where the light source that causes the shadow is the sun; a case where the light source that causes the shadow is an immovably installed lighting device; and a case where the light source that causes the shadow is a lamp of a moving body including the light source. The light source position estimation unit 69 also estimates the position of the sun, the immovably installed lighting device, or the moving body, as the light source.

(Collision Determination Unit)

The collision determination unit 71 determines possibility of collision between the vehicle 1 and the latent object, on the basis of the data regarding the shadow of the latent object detected by the shadow region detection unit 67 and the data regarding of the position of the light source estimated by the light source position estimation unit 69. Specifically, the collision determination unit 71 calculates a position, a direction of movement, and a speed of movement of the latent object in the blind spot region, on the basis of the position of the light source and a time change in the shadow of the latent object, and determines the possibility of collision between the vehicle 1 and the latent object.

(Driving Condition Setting Unit)

In a case where the collision determination unit 71 determines the presence of the possibility of collision between the vehicle 1 and the latent object, the driving condition setting unit 73 sets the driving condition of the vehicle 1 to avoid the collision. Specifically, the driving condition setting unit 73 sets a target acceleration rate or a target steering angle to decelerate the vehicle 1 or to correct a travel locus, and transmits these pieces of data to the vehicle control device 41. Upon receiving the data regarding the driving condition, the vehicle control device 41 controls the driving of each of the control units on the basis of the data regarding the driving condition set.

(Notification Unit)

In the case where the collision determination unit 71 determines the presence of the possibility of collision between the vehicle 1 and the latent object, the notification unit 75 outputs a command signal to the notification device 43 to notify the driver of the presence of the possibility of collision. The notification unit 75 may not only notify the presence of the possibility of collision, but also notify data regarding the latent object expected to rush, e.g., a position of a rush and a speed of the rush.

<1-3. Operation of Driver Assistance Apparatus>

Next, an operation example of the driver assistance apparatus 50 according to the present embodiment is described in detail with reference to flowcharts.

FIGS. 3 and 4 are flowcharts illustrating an example of processing operation of the driver assistance apparatus 50 according to the present embodiment. First, upon a start-up of an on-vehicle system including the driver assistance apparatus 50 (step S11), the surrounding environment detection unit 63 of the processor 51 acquires surrounding environment data around the vehicle 1 (step S13). Specifically, the surrounding environment detection unit 63 detects an object present around the vehicle 1 on the basis of the detection data transmitted from the surrounding environment sensor 31. Moreover, the surrounding environment detection unit 63 calculates the position, the size, and the speed of the object detected, the distance from the vehicle 1 to the object, and the relative speed between the vehicle 1 and the object.

For example, the surrounding environment detection unit 63 detects an object ahead of the vehicle 1 with the use of, for example, a pattern matching technique, by performing image processing on the image data transmitted from the forward view capturing cameras 31LF and 31RF. Moreover, the surrounding environment detection unit 63 calculates the position and the size of the object as viewed from the vehicle 1, and the distance to the object, on the basis of the position of the object in the image data, a size of an occupied area by the object in the image data, and data regarding parallax of the left and right forward view capturing cameras 31LF and 31RF. Furthermore, the surrounding environment detection unit 63 calculates the relative speed between the vehicle 1 and the object by time differentiating a change in the distance, and calculates a speed of the object on the basis of the data regarding the relative speed and data regarding the vehicle speed of the vehicle 1.

The surrounding environment detection unit 63 labels, as a stationary object, an object having a speed equal to or less than a predetermined value, e.g., a slow speed (10 km/h or less) out of the detected objects. The surrounding environment detection unit 63 labels, as a moving object, an object having a speed exceeding the predetermined value. The predetermined value may be 0 km/h. However, setting the slow speed to the predetermined value makes it possible to detect a pedestrian having a risk of a rush out of a blind spot region between slow-moving vehicles in traffic congestion, as an object present in the blind spot region in the technology of the disclosure. The surrounding environment detection unit 63 records data regarding the detected object in the storage 53. However, the method of detecting the object is not limited to the example mentioned above.

Next, the blind spot region detection unit 65 of the processor 51 refers to the high-precision map data held in the high-precision map data storage 55, and acquires data regarding, for example, roads and structures around the vehicle 1 on the basis of data regarding a current position of the vehicle 1 transmitted from the GNSS sensor 37 (step S15). For example, the blind spot region detection unit 65 acquires data regarding a position and a shape of a road on which the vehicle 1 is traveling, and a position, a shape, and a size (height) of a structure at an edge of the road on which the vehicle 1 is traveling.

Next, the blind spot region detection unit 65 determines presence or absence of any blind spot regions ahead of the vehicle 1 (step S17). Specifically, the blind spot region detection unit 65 determines the presence or the absence of any blind spot regions as viewed from the vehicle 1, ahead of the vehicle 1, on the basis of the data regarding the surrounding environment detected in step S13 and the data regarding the surroundings around the vehicle 1 acquired in step S15. For example, in a case with the presence of a parked vehicle ahead of the vehicle 1 or in a case where the back of the corner ahead of the vehicle 1 is invisible, the blind spot region detection unit 65 determines the presence of the blind spot region.

In a case without a determination of the presence of the blind spot region (S17/No), unless a determination is made in step S21 that the on-vehicle system has stopped, the processor 51 causes the flow to return to step S13 and repeat the processes until the blind spot region is detected. Meanwhile, in a case with the determination of the presence of the blind spot region (S17/Yes), the shadow region detection unit 67 determines presence or absence of any shadows of latent objects present in the blind spot region (step S19). Specifically, the shadow region detection unit 67 detects the shadows present in the image data on the basis of the image data transmitted from the surrounding environment sensor 31. Moreover, in a case with the presence of a shadow of an object, among the detected shadows, that is not detected by the surrounding environment detection unit 63 and extends outward from the blind spot region, the shadow region detection unit 67 determines the presence of the shadow of the latent object present in the blind spot region.

In a case without a determination of the presence of the shadow of the latent object present in the blind spot region (S19/No), unless the determination is made in step S21 that the on-vehicle system has stopped, the processor 51 causes the flow to return to step S13 and repeat the processes described above. Meanwhile, in a case with the determination of the presence of the shadow of the latent object present in the blind spot region (S19/Yes), the light source position estimation unit 69 of the processor 51 carries out processing of estimating the position of the light source that causes the shadow (step S23).

FIG. 5 is a flowchart illustrating an example of the processing of estimating the position of the light source.

First, the light source position estimation unit 69 acquires various kinds of data to estimate the light source and the position of the light source (step S41). In the present embodiment, the light source position estimation unit 69 acquires the image data transmitted from the surrounding environment sensor 31, the time data, the data regarding the position and a direction of travel of the vehicle 1 transmitted from the GNSS sensor 37, the high-precision map data held in the high-precision map data storage 55, the solar position data held in the solar position data storage 57, weather data transmitted from the telematics service, and the data regarding random vehicles acquired through the vehicle-to-vehicle communication.

Next, the light source position estimation unit 69 determines whether or not the light source that causes the shadow is the sun (step S43). For example, in a case where the weather is clear, and the current time is after the sunrise time and before the sunset time, the light source position estimation unit 69 determines that the light source is the sun. The time may be limited to, for example, from a predetermined period of time later than the sunrise time to a predetermined period of time earlier than the sunrise time. Furthermore, the light source position estimation unit 69 may also determine whether or not the sunlight is falling on a periphery of the shadow, on the basis of brightness and hue of the periphery of the shadow determined as the shadow of the latent object present in the blind spot region, in the image data transmitted from the surrounding environment sensor 31.

In a case with a determination that the light source is the sun (S43/Yes), the light source position estimation unit 69 estimates the position of the sun as viewed from the vehicle 1 or the blind spot region (step S45). Specifically, the light source position estimation unit 69 identifies the solar altitude and the direction (direction) of the sun at the current time on the basis of the time data and the solar position data. Furthermore, the light source position estimation unit 69 estimates the direction of the sun as viewed from the vehicle 1, on the basis of the data regarding the solar altitude and the direction of the sun, and the data regarding the direction of travel of the vehicle 1. It is possible to consider the solar altitude and the direction of the sun as viewed from the blind spot region, to be the same as the solar altitude and the direction of the sun as viewed from the vehicle 1. The light source position estimation unit 69 stores the estimated data regarding the solar altitude and the direction of the sun in the storage 53.

Meanwhile, in a case without the determination that the light source is the sun (S43/No), the light source position estimation unit 69 determines whether or not the light source is a streetlamp (step S47). For example, in a case where the current time is after the sunset time, and data regarding positions of installation of streetlamps included in the high-precision map data includes data regarding an applicable streetlamp, the light source position estimation unit 69 determines that the light source is a streetlamp. Specifically, in a case where the current time is after the sunset time, with presence of data regarding a streetlamp installed in an opposite direction to a direction of extension of the shadow extending from the blind spot region, the light source position estimation unit 69 determines that the light source is a streetlamp.

It is to be noted that, in the present embodiment, description is made by giving an example of a streetlamp as the immovably installed lighting device, but the immovably installed lighting device is not limited to streetlamps. It is sufficient that the immovably installed lighting device is any lighting device of which a position of installation is identifiable by the processor 51, e.g., a lighting device of which the position of installation is held in advance in the high-precision map data storage 55. The immovably installed lighting device may be, for example, a lighting device installed in commercial facilities or leisure facilities.

In a case with a determination that the light source is a streetlamp (S47/Yes), the light source position estimation unit 69 refers to the data regarding the position of installation and a height of the relevant streetlamp included in the high-precision map data, to estimate the position of the streetlamp as viewed from the blind spot region (step S49). In this case, the position of the streetlamp means the height and a direction of the light source of the streetlamp. The light source position estimation unit 69 stores the data regarding the estimated height and the direction of the streetlamp in the storage 53.

Meanwhile, in a case without the determination that the light source is a streetlamp (S47/No), the light source position estimation unit 69 determines whether or not the light source is a lamp of a moving body such as a vehicle (step S51). For example, in a case where the current time is after the sunset time, with presence of a random vehicle moving toward the blind spot region from an opposite direction to the direction of extension of the shadow extending from the blind spot region on the basis of the data regarding a position and a direction of travel of the random vehicle acquired through the vehicle-to-vehicle communication, the light source position estimation unit 69 determines that the light source is a lamp of a moving body.

In a case with a determination that the light source is a lamp of a moving body (S51/Yes), the light source position estimation unit 69 estimates, on the basis of the data regarding the random vehicle, a position of the lamp of the random vehicle as viewed from the blind spot region (step S53). In a case where the data regarding the random vehicle acquired through the vehicle-to-vehicle communication includes data regarding the kind of the random vehicle, the light source position estimation unit 69 estimates a height and a direction of the lamp of the random vehicle as viewed from the blind spot region, in accordance with: a distance on a GNSS system from positional coordinates of the random vehicle to a front part of the random vehicle; and a vehicle height of the random vehicle. In a case where the data regarding the random vehicle does not include the data regarding the kind of the random vehicle, the light source position estimation unit 69 estimates the height and the direction of the lamp of the random vehicle as viewed from the blind spot region, with the use of the data regarding a preset distance or height. The preset distance or height may be, for example, an average distance on the GNSS system from positional coordinates of a passenger car to a front part of a vehicle body, and an average value of a vehicle height of passenger cars. However, the preset distance or height is not limited thereto. The light source position estimation unit 69 stores data regarding the estimated height and the direction of the lamp of the moving body in the storage 53.

Meanwhile, in a case without the determination that the light source is a lamp of a moving body (S51/No), the light source position estimation unit 69 determines that the position of the light source is unidentifiable (step S55).

Returning to FIG. 4, after the end of the light source estimation processing, the collision determination unit 71 determines whether or not the light source has been identified (step S25). In a case where the light source has not been identified by the light source estimation processing (S25/No), the shadow region detection unit 67 determines whether or not the shadow of the latent object present in the blind spot region is moving (step S27). For example, the shadow region detection unit 67 determines that the shadow of the latent object present in the blind spot region is moving, in a case where a position of a shadow of a stationary object is changing, with a position of a light source that causes the shadow of the stationary object being estimatable.

In a case where the shadow of the latent object present in the blind spot region is not moving (S27/No), the flow returns to step S13 and repeats the processes described above, unless it is determined in step S39 that the on-vehicle system has stopped. In a case where the shadow of the latent object present in the blind spot region is moving (S27/Yes), this is not sufficient for a determination that the latent object present in the blind spot region is going to rush out in front of the vehicle 1, but the notification unit 75 performs alarm processing to notify the driver that the latent object is present in the blind spot region (step S29). For example, the notification unit 75 notifies the driver of the presence of the latent object in the blind spot region by one or more means of sound, alarm sound, and alarm display.

Meanwhile, in a case where the light source is identified by the light source estimation processing (S25/Yes), the collision determination unit 71 estimates a position, a direction of movement, and a speed of movement of the latent object on the basis of the position of the light source and the time change in the shadow of the latent object present in the blind spot region (step S31). In the following, description is given of a method of estimating the position, the direction of movement, and the speed of movement of the latent object in each of: the case where the light source is the sun, the case where the light source is a streetlamp; and the case where the light is a lamp of a moving body.

(Case where the Light Source is the Sun)

FIGS. 6 to 8 are diagrams provided for description of the method of estimating the position and the speed of movement of the latent object, in the case where the light source is the sun S, on the basis of the position of the sun S estimated in step S45 and the time change in a shadow 84 of the latent object. Here, description is made by giving an example of a travel scene as illustrated in FIG. 6, with a blind spot beyond a parked vehicle 80 present ahead on left side of a road on which the vehicle 1 is traveling, at the time when the sun S shines in the daytime. There is a pedestrian as the latent object in the blind spot region. The pedestrian is moving toward a path along which the vehicle 1 is traveling. From the vehicle 1, a shadow 81 of the parked vehicle 80 and the shadow 84 of the pedestrian are visually recognized.

FIGS. 7 and 8 are diagrams illustrating states of the travel scene in FIG. 6, as viewed from the direction of travel of the vehicle 1. FIG. 7 illustrates the situation at the time t. FIG. 8 illustrates the situation at the time t+Δt. A height of a pedestrian 83 is assumed to be h1. A distance from the pedestrian 83 to an outer edge of the parked vehicle 80 (tire position in the illustrated example) is assumed to be x1. A distance from the parked vehicle 80 to a tip of the shadow 84 of the pedestrian 83 is assumed to be L1. An angle formed by a line connecting the sun S and the tip of the shadow 84, and the ground is assumed to be θ1. The height h1 of the pedestrian 83 may be set to any value, e.g., an average height of children or adults. From the triangulation method, the following expressions (1) and (2) are established respectively at the time t and the time t+Δt.

[Mathematical Expression 1]
$$x1(t) = h1 * \cot\theta1(t) - L1(t) \tag{1}$$

[Mathematical Expression 2]
$$x1(t + \Delta t) = h1 * \cot\theta1(t + \Delta t) - L1(t + \Delta t) \tag{2}$$

In the case where the light source is the sun S, it is possible to consider the position of the light source to be unchanging in a short period of time. It follows, therefore, that cot θ1(t) and cot θ1(t+Δt) are approximately equal. Hence, it is possible to represent the speed of movement v of the pedestrian 83 by the following expression (3).

[Mathematical Expression 3]

$$v(t) = \frac{x1(t) - x1(t + \Delta t)}{\Delta t} \approx \frac{L1(t + \Delta t) - L1(t)}{\Delta t} \quad (3)$$

That is, the position of the pedestrian 83 at each of the time t and the time t+Δt is obtained by the forgoing expressions (1) and (2). The speed of movement v(t) of the pedestrian 83 from the time t to the time t+Δt is obtained by the forgoing expression (3). Thus, it is possible for the collision determination unit 71 to obtain the position and the speed of movement of the pedestrian 83, by obtaining the distance L1 from the parked vehicle 80 to the tip of the shadow 84 of the pedestrian 83, and the angle θ1 formed by the line connecting the sun S and the tip of the shadow 84, and the ground, on the basis of the image data transmitted from the surrounding environment sensor 31. Furthermore, it is possible for the collision determination unit 71 to obtain the direction of movement of the pedestrian 83 from a change in a position of the tip of the shadow 84 of the pedestrian 83. A reference point to obtain the direction of movement of the pedestrian 83 is not limited to the position of the tip of the shadow 84, but may be set at any position.

(Case where the Light Source is a Streetlamp)

FIGS. 9 to 11 are diagrams provided for description of the method of estimating the position and the speed of movement of the latent object, in the case where the light source is a streetlamp 93, on the basis of the position of the streetlamp 93 estimated in step S49 and the time change in a shadow 91 of the latent object. Here, description is made by giving an example of a travel scene as illustrated in FIG. 9 where the vehicle 1 is traveling at night along a road having sidewalls 94 and 95 on both left and right sides, with a blind spot beyond a corner present ahead on right side. There is a pedestrian 90 as the latent object in the blind spot region. The pedestrian 90 is moving toward the path along which the vehicle 1 is traveling. From the vehicle 1, the shadow 91 of the pedestrian 90 is visually recognized.

FIGS. 10 and 11 are diagrams illustrating states of the travel scene in FIG. 9, as viewed from the direction of travel of the vehicle 1. FIG. 10 illustrates the situation at the time t. FIG. 11 illustrates the situation at the time t+Δt. A height of the pedestrian 90 is assumed to be h2. A height of the light source of the streetlamp 93 is assumed to be H2. A distance from the pedestrian 90 to an edge of the sidewall 94 is assumed to be x2. A distance from a position of installation of the streetlamp 93 to the edge of the sidewall 94 is assumed to be X2. A distance from the edge of the sidewall 94 to a tip of the shadow 91 of the pedestrian 90 is assumed to be L2. An angle formed by a line connecting the light source of the streetlamp 93 and the tip of the shadow 91, and the ground is assumed to be as θ2. The height h2 of the pedestrian 90 may be set to any value, e.g., the average height of children or adults. From the triangulation method, the following expressions (4) and (5) are established respectively at the time t and the time t+Δt.

[Mathematical Expression 4]

$$\tan\theta 2(t) = \quad (4)$$
$$\frac{H2}{X2 + L2(t)} = \frac{h2}{x2(t) + L2(t)} \to x2(t) = (X2 + L2(t)) \times \frac{h2}{H2} - L2(t)$$

[Mathematical Expression 5]

$$\tan\theta 2(t + \Delta t) = \quad (5)$$
$$\frac{H2}{X2 + L2(t + \Delta t)} = \frac{h2}{x2(t + \Delta t) + L2(t + \Delta t)} \to x2(t + \Delta t) =$$
$$(X2 + L2(t + \Delta t)) \times \frac{h2}{H2} - L2(t + \Delta t)$$

The speed of movement v of the pedestrian 90 is obtained by dividing a distance of movement from the time t to the time t+Δt by time Δt. Accordingly, from the forgoing expressions (4) and (5), it is possible to represent the speed of movement v of the pedestrian 90 by the following expression (6).

[Mathematical Expression 6]

$$v(t) = \frac{x2(t) - x2(t + \Delta t)}{\Delta t} \quad (6)$$

That is, by the forgoing expressions (4) and (5), the position of the pedestrian 90 at each of the time t and the time t+Δt is obtained. By the forgoing expression (6), the speed of movement v(t) of the pedestrian 90 from the time t to the time t+Δt is obtained. Accordingly, it is possible for the collision determination unit 71 to obtain the position and the speed of movement of the pedestrian 90, by obtaining the horizontal distance X2 from the position of installation of the streetlamp 93 to the edge of the sidewall 94 on the basis of the high-precision map data, and obtaining the distance L2 from the edge of the sidewall 94 to the tip of the shadow 91 of the pedestrian 90, and the angle θ2 formed by the line connecting the light source of the streetlamp 93 and the tip of the shadow 91, and the ground, on the basis of the image data transmitted from the surrounding environment sensor 31. Furthermore, it is possible for the collision determination unit 71 to obtain the direction of movement of the pedestrian 90, from a change in a position of the tip of the shadow 91 of the pedestrian 90. A reference point to obtain the direction of movement of the pedestrian 90 is not limited to the position of the tip of the shadow 91, but may be set at any position.

(Case where the Light Source is a Lamp of a Moving Body)

FIGS. 12 to 14 are diagrams provided for description of the method of estimating the position and the speed of movement of the latent object, in the case where the light source is a lamp of a moving body, on the basis of the position of the lamp estimated in step S53 and the time change in a shadow 97 of the latent object. Here, description is made by giving an example of a travel scene as illustrated in FIG. 12 where the vehicle 1 is traveling at night along the road having the sidewalls 94 and 95 on both left and right sides, with the blind spot beyond the corner present ahead on the right side. There is a pedestrian 96 as the latent object in the blind spot region. The pedestrian 96 is moving toward the path along which the vehicle 1 is traveling. From the vehicle 1, the shadow 97 of the pedestrian 96 is visually recognized.

FIGS. 13 and 14 are diagrams illustrating states of the travel scene in FIG. 12, as viewed from the direction of travel of the vehicle 1. FIG. 13 illustrates the situation at the time t. FIG. 14 illustrates the situation at the time t+Δt. A height of the pedestrian 96 is assumed to be h3. A height of a lamp of a random vehicle 98 as the moving body is assumed to be H3. A distance from the pedestrian 96 to an edge of the sidewall 95 on the left side of the road is assumed to be x3. A distance from a position of the lamp of the random vehicle 98 to the edge of the sidewall 95 is assumed to be X3. A height of the shadow 97 of the pedestrian 96 cast on the sidewall 95 is assumed to be L3. An angle formed by a line connecting the lamp of the random vehicle 98 and a tip of the shadow 97 cast on the sidewall 95, and a line parallel to the ground is assumed to be θ3. The height h3 of the pedestrian 96 may be set to any value, e.g., the average height of children or adults. From the triangulation method, the following expressions (7) and (8) are established respectively at the time t and the time t+Δt.

[Mathematical Expression 7]

$$\tan\theta 3(t) = \frac{L3(t) - H3}{X3(t)} = \frac{L(t) - h3}{x3(t)} \rightarrow x3(t) = X3(t) \times \frac{L3(t) - h3}{L3(t) - H3} \quad (7)$$

[Mathematical Expression 8]

$$\tan\theta 3(t + \Delta t) = \frac{L3(t + \Delta t) - H3}{X3(t + \Delta t)} = \frac{L3(t + \Delta t) - h3}{x3(t + \Delta t)} \rightarrow x3(t + \Delta t) = X3(t + \Delta t) \times \frac{L3(t + \Delta t) - h}{L3(t + \Delta t) - H3} \quad (8)$$

The speed of movement v of the pedestrian 96 is obtained by dividing the distance of movement from the time t to the time t+Δt by the time Δt. Accordingly, from the forgoing expressions (7) and (8), it is possible to represent the speed of movement v of the pedestrian 96 by the following expression (9).

[Mathematical Expression 9]

$$v(t) = \frac{x3(t) - x3(t + \Delta t)}{\Delta t} \quad (9)$$

That is, by the forgoing expressions (7) and (8), the position of the pedestrian 96 at each of the time t and the time t+Δt is obtained. By the forgoing expression (9), the speed of movement v(t) of the pedestrian 96 from the time t to the time t+Δt is obtained. Accordingly, it is possible for the collision determination unit 71 to obtain the position and the speed of movement of the pedestrian 96, by obtaining the distance X3 from the lamp of the random vehicle 98 to the sidewall 95 on the basis of data regarding the random vehicle 98 acquired by the vehicle-to-vehicle communication and the high-precision map data, and obtaining the height L3 of the shadow 91 of the pedestrian 90 cast on the sidewall 95, and the angle θ3 formed by the line connecting the lamp of the random vehicle 98 and the tip of the shadow 97, and the line parallel to the ground, on the basis of the image data transmitted from the surrounding environment sensor 31. Furthermore, it is possible for the collision determination unit 71 to obtain the direction of movement of the pedestrian 96, from a change in a position of the tip of the shadow 97 of the pedestrian 96. A reference point to obtain the direction of movement of the pedestrian 96 is not limited to the position of the tip of the shadow 97, but may be set at any position.

It is to be noted that, although an example has been described in which the latent object is a pedestrian as an example of estimating the position, the direction of movement, and the speed of movement of the latent object on the basis of the position of the light source and the time change in the shadow, an object assumed to be the latent object is not limited to a pedestrian. The collision determination unit 71 may estimate the position, the direction of movement, and the speed of movement of the latent object, assuming other moving bodies such as a bicycle or a passenger car in addition to a pedestrian. In this case, it is preferable to change the value of the height h used in each of the forgoing expressions in accordance with the latent object assumed. Moreover, the processor 51 may detect an outline of the shadow region detected, and assume the kind of the latent object by, for example, matching processing. Assuming the kind of the latent object on the basis of the outline of the shadow region makes it possible to reduce a burden of calculation processing on the processors, as compared with a case where latent objects of multiple kinds are assumed.

Returning to FIG. 4, after estimating the position, the direction of movement, and the speed of movement of the latent object, the collision determination unit 71 determines the possibility of collision between the latent object and the vehicle 1 (step S33). For example, the collision determination unit 71 estimates the travel locus of the vehicle 1 on the basis of the data regarding the traveling state of the vehicle 1 detected by the traveling state detection unit 61, and assumes a travel range in accordance with a size of the vehicle 1. Thus, the collision determination unit 71 estimates a locus of the latent object on the basis of the position, the direction of movement, and the speed of movement of the latent object, and determines that the latent object and the vehicle 1 collide in a case where the locus of the latent object overlaps the travel range of the vehicle 1. However, the method of determining the possibility of collision between the latent object and the vehicle 1 is not limited to the forgoing example, and may be any determination method. For example, the possibility of collision between the latent object and the vehicle 1 may be determined by known risk calculation processing of setting a risk value for the vehicle 1 and the latent object and calculating a collision risk.

Next, as a result of the determination of the possibility of collision, the collision determination unit 71 determines presence or absence of the possibility that the latent object and the vehicle 1 collide (step S35). In a case with the absence of the possibility of collision (S35/No), the processor 51 causes the flow to return to step S13 and repeat the processes described above, unless it is determined in step S39 that the on-vehicle system has stopped. Meanwhile, in a case with the presence of the possibility of collision (S35/Yes), the processor 51 carries out driver assistance processing to avoid collision between the latent vehicle and the vehicle 1 (step S37).

For example, the driving condition setting unit 73 of the processor 51 transmits a command signal to decelerate the vehicle 1 to the vehicle control device 41, and decelerates the vehicle 1. In this case, the driving condition setting unit 73 may set the target acceleration rate low enough to avoid the collision, within a range below a maximum value of a deceleration rate. This makes it possible to reduce a risk to be caused by excessive rapid deceleration of the vehicle 1. Moreover, in a case where the collision is unavoidable only by the deceleration of the vehicle 1, or in conjunction with a deceleration operation of the vehicle 1, the driving condition setting unit 73 may set the target steering angle to correct the travel locus of the vehicle 1. In this case, the target steering angle is set not to cause spinning of the vehicle 1 or collision with, for example, a sidewall.

Furthermore, the notification unit 75 of the processor 51 may output the command signal to the notification device 43, and give a notification of the possibility that the vehicle 1 and the latent object collide. In this case, the notification unit 75 may also give a notification of possibility that the latent object rushes out of the blind spot region, or a notification of the data regarding the latent object such as the position of a rush and the speed of the rush of the latent object. Furthermore, the notification unit 75 may give a notification of intervention in a driving operation to avoid the collision between the potential object and the vehicle 1.

Next, the processor 51 determines whether or not the on-vehicle system has stopped (step S39). In a case where the on-vehicle system has not stopped (S39/No), the processor 51 causes the flow to return to step S13 and repeat the processes of the steps described above. Meanwhile, in a case where the on-vehicle system has stopped (S39/Yes), the processor 51 ends the processing of this routine.

As described above, the driver assistance apparatus 50 according to the present embodiment detects the shadow of the latent object present in the blind spot region as viewed from the vehicle 1 on the basis of the image data generated by the forward view capturing cameras 31LF and 31RF, and estimates the position of the light source that causes the shadow. Moreover, the driver assistance apparatus 50 calculates the position, the direction of movement, and the speed of movement of the latent object on the basis of the estimated position of the light source and the time change in the shadow of the latent object, to determine the possibility of collision between the vehicle 1 and the latent object. Thus, in a case with a blind spot region detected, no driver assistance such as the deceleration of the vehicle 1 is provided in a case where actual possibility of a rush of an object is unknown. Instead, driver assistance is provided in a case where the presence of the latent object in the blind spot region is recognized, and possibility is that a rush of the latent object may cause collision with the vehicle 1. Accordingly, it is possible to reduce the possibility of collision between the vehicle 1 and the latent object, and to prevent lowered reliability or acceptability of the driver assistance apparatus.

Moreover, the driver assistance apparatus 50 according to the present embodiment is able to estimate the position of the sun, calculate the position, the direction of movement, and the speed of movement of the latent object, and determine the possibility of collision between the vehicle 1 and the latent object. Thus, if a condition is established that the latent object is illuminated with the sunlight in the daytime and casts the shadow, it is possible to determine the possibility of collision between the vehicle 1 and the latent object, on the basis of, for example, the position of the latent object present in the blind spot region as viewed from the vehicle 1.

Moreover, the driver assistance apparatus 50 according to the present embodiment is able to estimate the position of the unmovably installed lighting device, calculate the position, the direction of movement, and the speed of movement of the latent object, and determine the possibility of collision between the vehicle 1 and the latent object. This makes it possible to determine the possibility of collision between the vehicle 1 and the latent object on the basis of, for example, the position of the latent object present in the blind spot region as viewed from the vehicle 1, in a case with the presence of the lighting device that illuminates the latent object even in a period of the day after the sunset time.

Furthermore, the driver assistance apparatus 50 according to the present embodiment is able to estimate the position of the light source provided in the moving body, calculate the position, the direction of movement, and the speed of movement of the latent object, and determine the possibility of collision between the vehicle 1 and the latent object. This makes it possible to determine the possibility of collision between the vehicle 1 and the latent object on the basis of, for example, the position of the latent object present in the blind spot region as viewed from the vehicle 1, in a case with the presence of, for example, the random vehicle that illuminates the latent object in the period of the day after the sunset time without any lighting devices that illuminate the latent object.

It is to be noted that, the forgoing embodiment has a configuration in which the case where the light source is the sun, the case where the light source is an unmovably installed lighting device, and the case where the light source is a lamp of a moving body are distinguishable. However, a configuration may be possible in which only one of them, or a combination of any two of them is distinguishable. In this case, the driver assistance apparatus 50 may be configured not to acquire data unnecessary for the determination, in accordance with the kind of the light source to be distinguished.

2. Second Embodiment

Next, description is given of a driver assistance apparatus according to a second embodiment of the disclosure.

In the first embodiment, description is given of an embodiment of a case where the driver assistance apparatus 50 is able to acquire the data regarding the position where the light source is present or the position of installation of the light source. However, in the second embodiment, description is given of an embodiment of a case where the data regarding the position where the light source is present is unacquirable by the driver assistance apparatus.

It is to be noted that functions of the driver assistance apparatus according to the present embodiment may be used in combination with the functions of the driver assistance apparatus according to the first embodiment.

<2-1. Overall Configurations of Vehicle and Driver Assistance Apparatus>

Overall configurations of the driver assistance apparatus according to the present embodiment and the vehicle on which the driver assistance apparatus is mounted may be the same as those of the driver assistance apparatus 50 and the vehicle 1 according to the first embodiment. However, in a case where the driver assistance apparatus includes only the functions of the driver assistance apparatus according to the second embodiment, the driver assistance apparatus does not have to include the solar position data storage 57, the first communication unit 58, and the second communication unit 59.

In the following, description is given of the driver assistance apparatus according to the second embodiment, using the same reference numerals, with reference to the configuration example of the driver assistance apparatus 50 illustrated in FIG. 2.

<2-2. Functional Configuration of Driver Assistance Apparatus>

Out of the functional configuration of the processor 51 of the driver assistance apparatus 50, the traveling state detection unit 61, the surrounding environment detection unit 63, the blind spot region detection unit 65, the shadow region detection unit 67, the collision determination unit 71, the driving condition setting unit 73, and the notification unit 75 have similar functions to the respective units of the processor 51 of the driver assistance apparatus 50 according to the first embodiment.

In the present embodiment, the light source position estimation unit 69 traces the shadow of the moving body that has revealed itself by moving out of the blind spot region from within the blind spot region, and estimates the position of the light source on the basis of the time change in the shadow of the moving body. If the position of the light source is estimated on the basis of the time change in the shadow of the moving body that has revealed itself, it is possible to estimate the position, the direction of movement, and the speed of movement of the latent object on the basis of time changes in shadows of other latent objects caused by the same light source, and the position of the light source. Hence, it is possible to determine the possibility of collision between the latent object present in the blind spot region and the vehicle 1, even in a travel scene where data regarding the position of the light source that causes the shadow is unacquirable.

<2-3. Operation of Driver Assistance Apparatus>

Next, an operation example of the driver assistance apparatus 50 according to the present embodiment is described in detail with reference to flowcharts.

FIGS. 15 and 16 are flowcharts illustrating an example of processing operation of the driver assistance apparatus 50 according to the present embodiment. In the flowcharts illustrated in FIGS. 15 to 16, processing of steps S11 to S21 and steps S27 to S39 is carried out in a similar manner to the processing of steps S11 to S21 and steps S27 to S39 in the processing operation of the driver assistance apparatus 50 of the first embodiment illustrated in FIGS. 3 and 4. Meanwhile, in the driver assistance apparatus 50 of the present embodiment, processing of steps S61 to S65 is carried out instead of steps S23 to S25 in the processing operation of the driver assistance apparatus 50 of the first embodiment.

At the start-up of the on-vehicle system including the driver assistance apparatus 50 (step S11), the processor 51 carries out the processing of steps S11 to S21 in accordance with the procedure described in the first embodiment.

In step S19, in the case with the determination of the presence of the shadow of the object present in the blind spot region (S19/Yes), the shadow region detection unit 67 determines whether or not any object is detected that has moved from the blind spot region to outside the blind spot region (step S61). Specifically, the shadow region detection unit 67 determines that an object is detected that has moved from the blind spot region to outside the blind spot region, in a case where the shadow that has been detected as the shadow of the latent object present in the blind spot region is changed to the shadow of the object detected by the surrounding environment detection unit 63.

In a case where no object is detected that has moved from the blind spot region to outside the blind spot region (S61/No), the shadow region detection unit 67 causes the flow to proceed to step S27 to determine whether or not the shadow of the latent object present in the blind spot region is moving. Meanwhile, in a case where the object is detected that has moved from the blind spot region to outside the blind spot region (S61/Yes), the light source position estimation unit 69 carries out the processing of estimating the position of the light source that causes the shadow (step S63). In the following, the method of estimating the position of the light source is described by giving an example where the light source is a streetlamp.

FIGS. 17 to 19 are diagrams provided for description of the method of estimating a position of a light source (streetlamp) 109 on the basis of a time change in a shadow 105 of a random vehicle 103 that has moved from a blind spot region to outside the blind spot region, in a case where the light source is the streetlamp 109. Here, description is given of an example of a travel scene as illustrated in FIG. 17 where the vehicle 1 is traveling at night along a road with a building 107 on right side of the road, with a blind spot beyond a corner behind the building 107. There is a pedestrian 100 present as the latent object in the blind spot region. The pedestrian 100 is moving toward the path along which the vehicle 1 is traveling. Moreover, the random vehicle 103 present as the latent object in the blind spot region moves out of the blind spot region and becomes an object that has revealed itself. From the vehicle 1, a shadow 101 of the pedestrian 100, the random vehicle 103, and the shadow 105 of the random vehicle 103 are visually recognized.

FIGS. 18 and 19 are diagrams illustrating states of the travel scene in FIG. 17, as viewed from the direction of travel of the vehicle 1. FIG. 18 illustrates the situation at the time t. FIG. 19 illustrates the situation at the time t+Δt. A height of the light source of the streetlamp 109 is assumed to be H4. A height from the ground to a portion 104 of the random vehicle 103 where a line connecting the light source of the streetlamp 109 and a tip of the shadow 105 of the random vehicle 103 is tangent to the random vehicle 103 is assumed to be h4. A horizontal distance from the portion 104 to the tip of the shadow 105 is assumed to be x4. A horizontal distance from the light source of the streetlamp 109 to an edge of the building 107 is assumed to be X4. A horizontal distance from the edge of the building 107 to the tip of the shadow 105 of the random vehicle 103 is assumed to be L4. An angle formed by the line connecting the light source of the streetlamp 109 and the tip of the shadow 105 of the random vehicle 103, and the ground is assumed to be θ4. The tip of the shadow 105 is a shadow of the portion 104 of the random vehicle 103. In the present embodiment, the height H4 of the light source of the streetlamp 109 and the horizontal distance X4 from the light source of the streetlamp 109 to the edge of the building 107 are unknown values. From the triangulation method, the following expressions (10) and (11) are established respectively at the time t and the time t+Δt.

[Mathematical Expression 10]

$$\tan\theta 4(t) = \frac{H4}{L4(t) + X4} = \frac{h4}{x4(t)} \rightarrow H4 = (L4(t) + X4) \times \frac{h4}{x4(t)} \quad (10)$$

[Mathematical Expression 11]

$$\tan\theta 4(t + \Delta t) = \frac{H4}{L4(t + \Delta t) + X4} = \frac{h4}{x4(t + \Delta t)} \rightarrow H4 = (L4(t + \Delta t) + X4) \times \frac{h4}{x4(t + \Delta t)} \quad (11)$$

It is possible to calculate the height h4 and the distances x4 and L4 on the basis of the image data transmitted from the surrounding environment sensor 31, except for the height H4 of the light source of the streetlamp 109 and the horizontal distance X4 from the light source of the streetlamp 109 to the edge of the building 107. Hence, it is possible for the light source position estimation unit 69 to calculate the height H4 of the light source of the streetlamp 109 and the horizontal distance X4 from the light source of the streetlamp 109 to the edge of the building 107 with the use of the forgoing expressions (10) and (11) by obtaining each of the height h4 and the distances x4 and L4 on the basis of the image data.

Returning to FIG. 16, after the position of the light source is estimated by the light source position estimation unit 69, the shadow region detection unit 67 determines the presence or the absence of any shadows of the latent objects present in the blind spot region, by a similar procedure to that of the processing in step S19 (step S65). In a case with the absence of any shadows of the latent objects present in the blind spot region (S65/No), the processor 51 causes the flow to return to step S13 and repeat the processes described above unless it is determined in step S39 that the on-vehicle system has stopped. Meanwhile, in the case with the presence of the shadow of the latent object present in the blind spot region (S65/Yes), the flow proceeds to step S31, and the processor 51 carries out the processing of steps S31 to S39 in accordance with the procedure described in the first embodiment. Thus, in the driver assistance apparatus 50, it is possible to estimate the position of the light source by tracing the shadow of the moving body that has moved from the blind spot region to outside the blind spot region, and to estimate the position, the direction of movement, and the speed of movement of the latent object present in the blind spot region, even in the case where the data regarding the position of the light source is unacquirable.

As described above, the driver assistance apparatus 50 according to the present embodiment is able to estimate the position of the light source by tracing the shadow of the moving body that has moved from the blind spot region to outside the blind spot region even in the case where the data regarding the position of the light source is unacquirable. Accordingly, as with the driver assistance apparatus 50 according to the first embodiment, it is possible to calculate the position, the direction of movement, and the speed of movement of the latent object on the basis of the estimated position of the light source and the time change in the shadow of the latent object, and determine the possibility of collision between the vehicle 1 and the latent object, even in the case where the data regarding the position of the light source is unacquirable. Thus, in the case where the blind spot region is detected, no driver assistance such as the deceleration of the vehicle 1 is provided in the case where actual possibility of a rush of an object is unknown. Instead, the driver assistance is provided in the case where the presence of the latent object in the blind spot region is recognized, and possibility is that the rush of the latent object may cause the collision with the vehicle 1. Hence, it is possible to reduce the possibility of collision between the vehicle 1 and the latent object, and to prevent lowered reliability or acceptability of the driver assistance apparatus.

It is to be noted that, in the present embodiment, the light source position estimation unit 69 may record the data regarding the estimated position of the light source on the high-precision map data. Thus, the data regarding the position of the light source is accumulated, making it easy to identify the light source that causes the shadow of the latent object, as with the case in the first embodiment where the light source is a streetlamp. This leads to reduction of a burden of the processing of estimating the position of the light source.

Although preferred embodiments of the disclosure have been described in the foregoing with reference to the accompanying drawings, the disclosure is by no means limited to such examples. It should be appreciated that various modifications and alterations may be made by persons skilled in the art without departing from the scope as defined by the appended claims. The disclosure is intended to include such modifications and alterations in so far as they fall within the scope of the appended claims.

For example, in the foregoing embodiments, description is given of an example with the single light source that causes shadows. However, the technology of the disclosure is also applicable to a case with multiple light sources that cause shadows, i.e., a case where the single latent object casts multiple shadows. In this case, the driver assistance apparatus may calculate the position, the direction of movement, and the speed of movement of the latent object on the basis of the positions of the light sources that cause the respective shadows and time changes in the shadows, and determine the possibility of collision between the vehicle and the latent object with the use of their respective average values. Alternatively, the driver assistance apparatus may calculate the position, the direction of movement, and the speed of movement of the latent object by weighting based on darkness of the shadows and sharpness of outlines of the shadows, and determine the possibility of collision between the vehicle and the latent object. Estimating, for example, the position of the latent object on the basis of the time changes in the shadows caused by the multiple light sources makes it possible to enhance accuracy of the determination of the possibility of collision between the vehicle and the latent object.

Moreover, a computer program is also included in the scope of the appended claims that causes a processor that constitutes the processor 51 described above to execute processing including: detecting a shadow of an object present in a blind spot region as viewed from a vehicle, on the basis of image data that captures a surrounding view around the vehicle; estimating a position of a light source that causes the shadow; and calculating a position, a direction of movement, and a speed of movement of the object on the basis of the position of the light source and a time change in the shadow, and determining possibility of collision between the vehicle and the object.

DESCRIPTION OF REFERENCE NUMERALS

1: Vehicle (the vehicle)
31: Surrounding environment sensor
31LF, 31RF: Forward view capturing camera
35: Vehicle state sensor
37: GNSS sensor
41: Vehicle control device
43: Notification device
50: Driver assistance apparatus
51: Processor
53: Storage
55: High-precision map data storage
57: Solar position data storage
61: Traveling state detection unit
63: Surrounding environment detection unit
65: Blind spot region detection unit
67: Shadow region detection unit
69: Light source position estimation unit
71: Collision determination unit
73: Driving condition setting unit
75: Notification unit
80: Parked vehicle
81: Shadow
83: Pedestrian
84: Shadow
90: Pedestrian
91: Shadow
93: Streetlamp
94: Sidewall
95: Sidewall 96: Pedestrian
97: Shadow
98: Random vehicle

The invention claimed is:

1. A driver assistance apparatus configured to assist in driving to avoid collision with an object, the driver assistance apparatus comprising:
    one or more processors; and
    one or more memories communicably coupled to the one or more processors, wherein the one or more processors are configured to:
    detect a shadow of an object present in a blind spot region as viewed from a vehicle, on a basis of image data that captures a surrounding view around the vehicle, the shadow extending outward from the blind spot region and including an edge that is located outside the blind spot region;
    estimate a position of a light source that causes the shadow;
    estimate a position, a direction of movement, and a speed of movement of the object based on the position of the light source and a change over time in a distance from the blind spot region to the edge of the shadow, and determine possibility of collision between the vehicle and the object; and
    upon determining that there is a possibility of the collision, generate a control signal and control, using the generated control signal, deceleration or a steering angle of the vehicle to avoid the collision between the vehicle and the object.

2. The driver assistance apparatus according to claim 1, wherein the one or more processors are configured to
    detect a moving body and a shadow of the moving body on the basis of the image data, the moving body having moved from the blind spot region to outside the blind spot region, and
    estimate the position of the light source on a basis of the moving body and the shadow of the moving body.

3. The driver assistance apparatus according to claim 1, wherein the one or more processors are further configured to:
    identify a type of the light source from among types of the light source based on current time, wherein the types of the light source include the sun and one or more unmovably installed lighting devices;
    acquire a set of data corresponding to the identified type of the light source, wherein an amount of the data acquired when the identified type of the light source is the sun is less than an amount of the data acquired when the identified type of the light source is the one or more unmovably installed lighting devices; and
    set an estimation method corresponding to the identified type of the light source, wherein the estimation method is different for each type of the light source, and
    wherein estimating the position, the direction of movement, and the speed of movement of the object by the one or more processors is further based on the set of the data and the estimation method.

4. The driver assistance apparatus according to claim 1, wherein estimating the position of the light source, by the one or more processors, includes:
    determining that the light source that causes the shadow is the sun based on data regarding sunrise time and sunset time, and current time;
    upon determining that the light source is the sun, determining a position of the sun based on the current time and solar position data;
    upon failure to determine that light source is the sun, determining that the light source that causes the shadow is one of unmovably installed lighting devices based on the current time and map data indicating locations of the unmovably installed lighting devices; and
    upon determining that the light source is the one of the unmovably installed lighting devices, determining a position of the one of the unmovably installed lighting devices based on the map data.

5. The driver assistance apparatus according to claim 4, wherein estimating the position of the light source, by the one or more processors, further includes:
    upon failure to determine that the light source is the one of the unmovably installed lighting devices, determining that the light source that causes the shadow is a lamp of a moving body based on the current time and externally received data regarding the moving body; and
    upon determining that the light source is the lamp of the moving body, determining a position of the lamp of the moving body based on a positional relationship between the vehicle and the moving body.

6. A driver assistance apparatus configured to assist in driving to avoid collision with an object, the driver assistance apparatus comprising:
    a shadow region detection unit configured to detect a shadow of an object present in a blind spot region as viewed from a vehicle, on a basis of image data that captures a surrounding view around the vehicle, the shadow extending outward from the blind spot region and including an edge that is located outside the blind spot region;
    a light source position estimation unit configured to estimate a position of a light source that causes the shadow;
    a collision determination unit configured to estimate a position, a direction of movement, and a speed of movement of the object based on the position of the light source and a change over time in a distance from the blind spot region to the edge of the shadow, and determine possibility of collision between the vehicle and the object; and
    a driving condition setting unit configured to, upon determining that there is a possibility of the collision, generate a control signal and control, using the generated control signal, deceleration or a steering angle of the vehicle to avoid the collision between the vehicle and the object.

7. The driver assistance apparatus according to claim 6, wherein
    the light source position estimation unit is further configured to identify a type of the light source from among types of the light source based on current time, wherein the types of the light source include the sun and one or more unmovably installed lighting devices,
    the collision determination unit is further configured to:
        acquire a set of data corresponding to the identified type of the light source, wherein an amount of the data acquired when the identified type of the light source is the sun is less than an amount of the data acquired when the identified type of the light source is the one or more unmovably installed lighting devices; and set an estimation method corresponding to the identified type of the light source, wherein the estimation method is different for each type of the light source, and the collision determination unit is configured to estimate the position, the direction of movement, and the speed of movement of the object further based on the set of the data and the estimation method.

8. The driver assistance apparatus according to claim 6, wherein estimating the position of the light source, by the light source position estimation unit, includes:
   determining that the light source that causes the shadow is the sun based on data regarding sunrise time and sunset time, and current time;
   upon determining that the light source is the sun, determining a position of the sun based on the current time and solar position data;
   upon failure to determine that light source is the sun, determining that the light source that causes the shadow is one of unmovably installed lighting devices based on the current time and map data indicating locations of the unmovably installed lighting devices; and
   upon determining that the light source is the one of the unmovably installed lighting devices, determining a position of the one of the unmovably installed lighting devices based on the map data.

9. The vehicle according to claim 8, wherein estimating the position of the light source, by the light source position estimation unit, further includes:
   upon failure to determine that the light source is the one of the unmovably installed lighting devices, determining that the light source that causes the shadow is a lamp of a moving body based on the current time and externally received data regarding the moving body; and
   upon determining that the light source is the lamp of the moving body, determining a position of the lamp of the moving body based on a positional relationship between the vehicle and the moving body.

10. A vehicle provided with a driver assistance apparatus configured to assist in driving to avoid collision with an object, the driver assistance apparatus comprising:
    one or more processors; and
    one or more memories communicably coupled to the one or more processors, wherein the one or more processors are configured to:
       detect a shadow of an object present in a blind spot region as viewed from a vehicle, on a basis of image data that captures a surrounding view around the vehicle, the shadow extending outward from the blind spot region and including an edge that is located outside the blind spot region;
       estimate a position of a light source that causes the shadow
       estimate a position, a direction of movement, and a speed of movement of the object based on the position of the light source and a change over time in a distance from the blind spot region to the edge of the shadow, and determine possibility of collision between the vehicle and the object; and
       upon determining that there is a possibility of the collision, generate a control signal and control, using the generated control signal, deceleration or a steering angle of the vehicle to avoid the collision between the vehicle and the object.

11. The vehicle according to claim 10,
    wherein the one or more processors are further configured to:
       identify a type of the light source from among types of the light source based on current time, wherein the types of the light source include the sun and one or more unmovably installed lighting devices;
       acquire a set of data corresponding to the identified type of the light source, wherein an amount of the data acquired when the identified type of the light source is the sun is less than an amount of the data acquired when the identified type of the light source is the one or more unmovably installed lighting devices; and
       set an estimation method corresponding to the identified type of the light source, wherein the estimation method is different for each type of the light source, and
    wherein the one or more processors are configured to estimate the position, the direction of movement, and the speed of movement of the object further based on the set of the data and the estimation method.

12. The vehicle according to claim 10, wherein estimating the position of the light source, by the one or more processors, includes:
    determining that the light source that causes the shadow is the sun based on data regarding sunrise time and sunset time, and current time;
    upon determining that the light source is the sun, determining a position of the sun based on the current time and solar position data;
    upon failure to determine that light source is the sun, determining that the light source that causes the shadow is one of unmovably installed lighting devices based on the current time and map data indicating locations of the unmovably installed lighting devices; and
    upon determining that the light source is the one of the unmovably installed lighting devices, determining a position of the one of the unmovably installed lighting devices based on the map data.

13. The vehicle according to claim 12, wherein estimating the position of the light source, by the one or more processors, further includes:
    upon failure to determine that the light source is the one of the unmovably installed lighting devices, determining that the light source that causes the shadow is a lamp of a moving body based on the current time and externally received data regarding the moving body; and
    upon determining that the light source is the lamp of the moving body, determining a position of the lamp of the moving body based on a positional relationship between the vehicle and the moving body.

14. A non-transitory recording medium containing a computer program applicable to a driver assistance apparatus configured to assist in driving to avoid collision with an object,
    the computer program causing one or more processors to execute processing comprising:
       detecting a shadow of an object present in a blind spot region as viewed from a vehicle, on a basis of image data that captures a surrounding view around the vehicle, the shadow extending outward from the blind spot region and including an edge that is located outside the blind spot region;

estimating a position of a light source that causes the shadow;

estimating a position, a direction of movement, and a speed of movement of the object based on the position of the light source and a change over time in a distance from the blind spot region to the edge of the shadow, and determining possibility of collision between the vehicle and the object; and upon determining that there is a possibility of the collision, generating a control signal-to and controlling, using the generated control signal, deceleration or a steering angle of the vehicle to avoid the collision between the vehicle and the object.

15. The driver assistance apparatus according to claim 14, wherein the processing further comprises:

identifying a type of the light source from among types of the light source based on current time, wherein the types of the light source include the sun and one or more unmovably installed lighting devices;

acquiring a set of data corresponding to the identified type of the light source, wherein an amount of the data acquired when the identified type of the light source is the sun is less than an amount of the data acquired when the identified type of the light source is the one or more unmovably installed lighting devices; and setting an estimation method corresponding to the identified type of the light source, wherein the estimation method is different for each type of the light source, and the estimating the position, the direction of movement, and the speed of movement of the object by the one or more processors is further based on the set of the data and the estimation method.

16. The driver assistance apparatus according to claim 14, wherein estimating the position of the light source includes:

determining that the light source that causes the shadow is the sun based on data regarding sunrise time and sunset time, and current time;

upon determining that the light source is the sun, determining a position of the sun based on the current time and solar position data;

upon failure to determine that light source is the sun, determining that the light source that causes the shadow is one of unmovably installed lighting devices based on the current time and map data indicating locations of the unmovably installed lighting devices; and upon determining that the light source is the one of the unmovably installed lighting devices, determining a position of the one of the unmovably installed lighting devices based on the map data.

17. The non-transitory recording medium according to claim 16, wherein estimating the position of the light source further includes:

upon failure to determine that the light source is the one of the unmovably installed lighting devices, determining that the light source that causes the shadow is a lamp of a moving body based on the current time and externally received data regarding the moving body; and upon determining that the light source is the lamp of the moving body, determining a position of the lamp of the moving body based on a positional relationship between the vehicle and the moving body.

* * * * *